(12) United States Patent
Neyman et al.

(10) Patent No.: US 9,516,171 B2
(45) Date of Patent: *Dec. 6, 2016

(54) PERSONAL DESKTOP ROUTER

(71) Applicant: Genesys Telecommunications Laboratories, Inc., Daly City, CA (US)

(72) Inventors: Igor Neyman, Palo Alto, CA (US); Myhailo Barskyy, San Mateo, CA (US); Alec Miloslavsky, San Carlos, CA (US); Oleg Bondarenko, San Carlos, CA (US); Valeriy Issayev, Foster City, CA (US); Andrei Petrov, Redwood, CA (US); Pavel Karpenko, Martinez, CA (US); Alex Smelik, San Bruno, CA (US); Alexander Volguin, Vancouver (CA); Yuri Ostapchuk, San Mateo, CA (US); Boris Livshits, San Bruno, CA (US); Hamid Dadgar, San Bruno, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,122

(22) Filed: May 8, 2015

(65) Prior Publication Data
US 2015/0244870 A1  Aug. 27, 2015

Related U.S. Application Data

(60) Continuation of application No. 13/671,558, filed on Nov. 8, 2012, now abandoned, which is a continuation
(Continued)

(51) Int. Cl.
*H04M 7/00* (2006.01)
*H04M 3/51* (2006.01)
(Continued)

(52) U.S. Cl.
CPC ........... *H04M 7/006* (2013.01); *H04M 1/2473* (2013.01); *H04M 3/42127* (2013.01);
(Continued)

(58) Field of Classification Search
USPC ................. 379/220.01, 221.14, 234, 219
See application file for complete search history.

(56) References Cited

U.S. PATENT DOCUMENTS 3,914,559 A  10/1975  Knollman
4,048,452 A   9/1977  Oehring et al.
(Continued)

FOREIGN PATENT DOCUMENTS

AT    270486    7/2004
AT    281039    11/2004
(Continued)

OTHER PUBLICATIONS

"Competitive Gateway Product," Nikkei Communications, Japan, No. 257, Nov. 1997, 18 pages.
(Continued)

*Primary Examiner* — Quynh Nguyen
(74) *Attorney, Agent, or Firm* — Lewis Roca Rothgerber Christie LLP

(57) ABSTRACT

A client-server telephone call router system as part of a customer premises system has a client-server router adapted to execute on a telephony switch, such as a public branch exchange (PBX) or other telephony switch, or on a processor connected by CTI link to a telephony switch. The telephony switch or processor executing the router is connected to a local area network (LAN) that also interconnects computer workstations proximate to telephones connected to the telephony switch. Client user interface applications run on the computer workstations, allowing clients to edit routing rules for the router, which has a list of routing rules keyed to users
(Continued)

and workstations of the customer premises system. The editing rules are kept by the router in portions dedicated to individual users. With this system a user can edit at a workstation on the LAN his\her own routing rules, and transmit the edits to the client-server router where the rules will be followed to route calls for that user and protocol.

6 Claims, 8 Drawing Sheets

Related U.S. Application Data of application No. 11/926,542, filed on Oct. 29, 2007, now Pat. No. 8,358,769, which is a continuation of application No. 11/317,946, filed on Dec. 22, 2005, now abandoned, which is a division of application No. 08/928,861, filed on Sep. 12, 1997, now Pat. No. 7,031,442, which is a continuation-in-part of application No. 08/869,815, filed on Jun. 4, 1997, now Pat. No. 6,148,074, which is a continuation-in-part of application No. 08/802,667, filed on Feb. 19, 1997, now Pat. No. 6,201,863, which is a continuation-in-part of application No. 08/797,420, filed on Feb. 10, 1997, now Pat. No. 6,185,291, said application No. 08/928,861 is a continuation-in-part of application No. 08/833,340, filed on Apr. 3, 1997, now Pat. No. 6,560,328, and a continuation-in-part of application No. 08/891,675, filed on Jul. 9, 1997, now Pat. No. 6,205,412.

(51) Int. Cl.
  *H04M 3/523* (2006.01)
  *H04M 1/247* (2006.01)
  *H04M 3/32* (2006.01)
  *H04M 3/42* (2006.01)

(52) U.S. Cl.
  CPC ... *H04M 3/42153* (2013.01); *H04M 3/42161* (2013.01); *H04M 3/5183* (2013.01); *H04M 3/5191* (2013.01); *H04M 3/523* (2013.01); *H04M 7/00* (2013.01); *H04M 3/323* (2013.01); *H04M 3/42042* (2013.01); *H04M 3/42059* (2013.01); *H04M 3/42102* (2013.01); *H04M 3/42221* (2013.01); *H04M 3/5235* (2013.01); *H04M 2201/40* (2013.01); *H04M 2201/42* (2013.01); *H04M 2203/408* (2013.01); *H04M 2242/22* (2013.01)

(56) References Cited

U.S. PATENT DOCUMENTS

| | | |
|---|---|---|
| 4,056,683 A | 11/1977 | Suehiro |
| 4,290,141 A | 9/1981 | Anderson et al. |
| 4,320,256 A | 3/1982 | Freeman |
| 4,345,315 A | 8/1982 | Cadotte et al. |
| 4,355,207 A | 10/1982 | Curtin |
| 4,355,372 A | 10/1982 | Johnson et al. |
| 4,400,587 A | 8/1983 | Taylor et al. |
| 4,439,636 A | 3/1984 | Newkirk et al. |
| 4,451,700 A | 5/1984 | Kempner et al. |
| 4,489,438 A | 12/1984 | Hughes |
| 4,517,410 A | 5/1985 | Williams et al. |
| 4,521,643 A | 6/1985 | Dupuis et al. |
| 4,523,055 A | 6/1985 | Hohl et al. |
| 4,528,643 A | 7/1985 | Freeny, Jr. |
| 4,539,435 A | 9/1985 | Eckmann |
| 4,555,903 A | 12/1985 | Heaton |
| 4,558,180 A | 12/1985 | Scordo |
| 4,559,415 A | 12/1985 | Bernard et al. |
| 4,566,030 A | 1/1986 | Nickerson et al. |
| 4,567,323 A | 1/1986 | Lottes et al. |
| 4,577,062 A | 3/1986 | Hilleary et al. |
| 4,577,067 A | 3/1986 | Levy et al. |
| 4,578,700 A | 3/1986 | Roberts et al. |
| 4,580,012 A | 4/1986 | Matthews et al. |
| 4,584,602 A | 4/1986 | Nakagawa |
| 4,587,379 A | 5/1986 | Masuda |
| 4,598,367 A | 7/1986 | DeFrancesco et al. |
| 4,603,232 A | 7/1986 | Kurland et al. |
| 4,611,094 A | 9/1986 | Asmuth et al. |
| 4,625,276 A | 11/1986 | Benton et al. |
| 4,630,200 A | 12/1986 | Ohmae et al. |
| 4,630,201 A | 12/1986 | White |
| 4,634,809 A | 1/1987 | Paulsson et al. |
| 4,649,563 A | 3/1987 | Riskin |
| 4,654,482 A | 3/1987 | DeAngelis |
| 4,667,287 A | 5/1987 | Allen et al. |
| 4,674,044 A | 6/1987 | Kalmus et al. |
| 4,679,189 A | 7/1987 | Olson et al. |
| 4,696,029 A | 9/1987 | Cohen |
| 4,697,282 A | 9/1987 | Winter et al. |
| 4,737,983 A | 4/1988 | Frauenthal et al. |
| 4,756,020 A | 7/1988 | Fodale |
| 4,757,267 A | 7/1988 | Riskin |
| 4,763,191 A | 8/1988 | Gordon et al. |
| 4,763,317 A | 8/1988 | Lehman et al. |
| 4,763,353 A | 8/1988 | Canale et al. |
| 4,771,425 A | 9/1988 | Baran et al. |
| 4,785,408 A | 11/1988 | Britton et al. |
| 4,788,715 A | 11/1988 | Lee |
| 4,811,382 A | 3/1989 | Sleevi |
| 4,812,843 A | 3/1989 | Champion, III et al. |
| 4,829,563 A | 5/1989 | Crockett et al. |
| 4,831,518 A | 5/1989 | Yu et al. |
| 4,852,001 A | 7/1989 | Tsushima et al. |
| 4,866,756 A | 9/1989 | Crane et al. |
| 4,881,261 A | 11/1989 | Oliphant et al. |
| 4,893,328 A | 1/1990 | Peacock |
| 4,896,345 A | 1/1990 | Thorne |
| 4,897,866 A | 1/1990 | Majmudar et al. |
| 4,908,850 A | 3/1990 | Masson et al. |
| 4,924,488 A | 5/1990 | Kosich |
| 4,943,995 A | 7/1990 | Daudelin et al. |
| 4,953,204 A | 8/1990 | Cuschleg, Jr. et al. |
| 4,972,461 A | 11/1990 | Brown et al. |
| 4,994,985 A | 2/1991 | Cree et al. |
| 5,001,710 A | 3/1991 | Gawrys et al. |
| 5,008,930 A | 4/1991 | Gawrys et al. |
| 5,017,917 A | 5/1991 | Fisher et al. |
| 5,020,095 A | 5/1991 | Morganstein et al. |
| 5,036,535 A | 7/1991 | Gechter et al. |
| 5,058,152 A | 10/1991 | Solomon et al. |
| 5,062,103 A | 10/1991 | Davidson et al. |
| 5,073,890 A | 12/1991 | Danielsen |
| 5,095,504 A | 3/1992 | Nishikawa et al. |
| 5,117,225 A | 5/1992 | Wang |
| 5,136,633 A | 8/1992 | Tejada et al. |
| 5,155,761 A | 10/1992 | Hammond |
| 5,164,983 A | 11/1992 | Brown et al. |
| 5,168,515 A | 12/1992 | Gechter et al. |
| 5,175,800 A | 12/1992 | Galis et al. |
| 5,179,589 A | 1/1993 | Syu |
| 5,181,236 A | 1/1993 | LaVallee et al. |
| 5,181,239 A | 1/1993 | Jolissaint |
| 5,185,782 A | 2/1993 | Srinivasan |
| 5,202,828 A | 4/1993 | Vertelney et al. |
| 5,206,903 A | 4/1993 | Kohler et al. |
| 5,208,745 A | 5/1993 | Quentin et al. |
| 5,212,727 A | 5/1993 | Ramkumar |
| 5,214,688 A | 5/1993 | Szlam et al. |
| 5,231,670 A | 7/1993 | Goldhor et al. |
| 5,247,569 A | 9/1993 | Cave |
| 5,249,223 A | 9/1993 | Vanacore |
| 5,253,288 A | 10/1993 | Frey et al. |
| 5,256,863 A | 10/1993 | Ferguson et al. |
| 5,261,096 A | 11/1993 | Howarth |
| 5,271,058 A | 12/1993 | Andrews et al. |

(56) References Cited

U.S. PATENT DOCUMENTS

| | | |
|---|---|---|
| 5,274,635 A | 12/1993 | Rahman et al. |
| 5,274,700 A | 12/1993 | Gechter et al. |
| 5,278,898 A | 1/1994 | Cambray et al. |
| 5,278,977 A | 1/1994 | Spencer et al. |
| 5,280,625 A | 1/1994 | Howarter et al. |
| 5,283,638 A | 2/1994 | Engberg et al. |
| 5,283,856 A | 2/1994 | Gross et al. |
| 5,285,494 A | 2/1994 | Sprecher et al. |
| 5,288,147 A | 2/1994 | Schaefer et al. |
| 5,291,550 A | 3/1994 | Levy et al. |
| 5,291,551 A | 3/1994 | Conn et al. |
| 5,291,552 A | 3/1994 | Kerrigan et al. |
| 5,299,259 A | 3/1994 | Otto |
| 5,299,260 A | 3/1994 | Shaio |
| 5,301,320 A | 4/1994 | McAtee et al. |
| 5,309,505 A | 5/1994 | Szlam et al. |
| 5,311,574 A | 5/1994 | Livanos |
| 5,311,583 A | 5/1994 | Friedes et al. |
| 5,315,709 A | 5/1994 | Alston, Jr. et al. |
| 5,327,486 A | 7/1994 | Wolff et al. |
| 5,329,583 A | 7/1994 | Jurgensen et al. |
| 5,333,266 A | 7/1994 | Boaz et al. |
| 5,335,268 A | 8/1994 | Kelly, Jr. et al. |
| 5,335,269 A | 8/1994 | Steinlicht |
| 5,343,477 A | 8/1994 | Yamada |
| 5,343,518 A | 8/1994 | Kneipp |
| 5,355,474 A | 10/1994 | Thuraisngham et al. |
| 5,359,649 A | 10/1994 | Rosu et al. |
| 5,363,507 A | 11/1994 | Nakayama et al. |
| 5,367,329 A | 11/1994 | Nakagaki et al. |
| 5,369,695 A | 11/1994 | Chakravarti et al. |
| 5,384,766 A | 1/1995 | Yamato et al. |
| 5,384,771 A | 1/1995 | Isidoro et al. |
| 5,384,829 A | 1/1995 | Heileman, Jr. et al. |
| 5,384,841 A | 1/1995 | Adams et al. |
| 5,392,277 A | 2/1995 | Bernstein |
| 5,392,328 A | 2/1995 | Schmidt et al. |
| 5,392,345 A | 2/1995 | Otto |
| 5,392,400 A | 2/1995 | Berkowitz et al. |
| 5,402,474 A | 3/1995 | Miller et al. |
| 5,414,762 A | 5/1995 | Flisik et al. |
| 5,422,813 A | 6/1995 | Schuchman et al. |
| 5,425,091 A | 6/1995 | Josephs |
| 5,425,093 A | 6/1995 | Trefzger |
| 5,426,594 A | 6/1995 | Wright et al. |
| 5,428,608 A | 6/1995 | Freeman et al. |
| 5,436,965 A | 7/1995 | Grossman et al. |
| 5,436,967 A | 7/1995 | Hanson |
| 5,440,719 A | 8/1995 | Hanes et al. |
| 5,444,767 A | 8/1995 | Goetcheus et al. |
| 5,444,774 A | 8/1995 | Friedes |
| 5,444,823 A | 8/1995 | Nguyen |
| 5,450,482 A | 9/1995 | Chen et al. |
| 5,450,483 A | 9/1995 | Williams |
| 5,452,350 A | 9/1995 | Reynolds et al. |
| 5,455,903 A | 10/1995 | Jolissaint et al. |
| 5,459,780 A | 10/1995 | Sand |
| 5,463,685 A | 10/1995 | Gaechter et al. |
| 5,465,286 A | 11/1995 | Clare et al. |
| 5,467,391 A | 11/1995 | Donaghue, Jr. et al. |
| 5,469,504 A | 11/1995 | Blaha |
| 5,473,680 A | 12/1995 | Porter |
| 5,475,813 A | 12/1995 | Cieslak et al. |
| 5,479,487 A | 12/1995 | Hammond |
| 5,481,616 A | 1/1996 | Freadman |
| 5,488,648 A | 1/1996 | Womble |
| 5,491,783 A | 2/1996 | Douglas et al. |
| 5,493,564 A | 2/1996 | Mullan |
| 5,495,522 A | 2/1996 | Allen et al. |
| 5,495,523 A | 2/1996 | Stent et al. |
| 5,496,392 A | 3/1996 | Sims et al. |
| 5,497,317 A | 3/1996 | Hawkins et al. |
| 5,497,371 A | 3/1996 | Ellis et al. |
| 5,497,373 A | 3/1996 | Hulen et al. |
| 5,500,891 A | 3/1996 | Harrington et al. |
| 5,506,898 A | 4/1996 | Costantini et al. |
| 5,509,062 A | 4/1996 | Carlsen |
| 5,510,829 A | 4/1996 | Sugiyama et al. |
| 5,511,117 A | 4/1996 | Zazzera |
| 5,517,620 A | 5/1996 | Hashimoto et al. |
| 5,519,773 A | 5/1996 | Dumas et al. |
| 5,524,047 A | 6/1996 | Brown et al. |
| 5,524,147 A | 6/1996 | Bean |
| 5,526,353 A | 6/1996 | Henley et al. |
| 5,528,678 A | 6/1996 | Kaplan |
| 5,530,740 A | 6/1996 | Irribarren et al. |
| 5,530,744 A | 6/1996 | Charalambous et al. |
| 5,533,103 A | 7/1996 | Peavey et al. |
| 5,533,107 A | 7/1996 | Irwin et al. |
| 5,533,108 A | 7/1996 | Harris et al. |
| 5,533,110 A | 7/1996 | Pinard et al. |
| 5,533,115 A | 7/1996 | Hollenbach et al. |
| 5,535,211 A | 7/1996 | Yano |
| 5,535,256 A | 7/1996 | Maloney et al. |
| 5,535,323 A | 7/1996 | Miller et al. |
| 5,537,470 A | 7/1996 | Lee |
| 5,537,630 A | 7/1996 | Berry et al. |
| 5,539,811 A | 7/1996 | Nakamura et al. |
| 5,544,220 A | 8/1996 | Trefzger |
| 5,546,452 A | 8/1996 | Andrews et al. |
| 5,550,816 A | 8/1996 | Hardwick et al. |
| 5,553,133 A | 9/1996 | Perkins |
| 5,555,299 A | 9/1996 | Maloney et al. |
| 5,555,426 A | 9/1996 | Johnson et al. |
| 5,557,667 A | 9/1996 | Bruno et al. |
| 5,559,868 A | 9/1996 | Blonder |
| 5,559,877 A | 9/1996 | Ash et al. |
| 5,559,878 A | 9/1996 | Keys et al. |
| 5,561,711 A | 10/1996 | Muller |
| 5,561,841 A | 10/1996 | Markus |
| 5,563,805 A | 10/1996 | Arbuckle et al. |
| 5,563,937 A | 10/1996 | Bruno et al. |
| 5,566,294 A | 10/1996 | Kojima et al. |
| 5,570,419 A | 10/1996 | Cave et al. |
| 5,570,420 A | 10/1996 | Bress et al. |
| 5,572,579 A | 11/1996 | Orriss et al. |
| 5,572,643 A | 11/1996 | Judson |
| 5,577,100 A | 11/1996 | McGregor et al. |
| 5,577,105 A | 11/1996 | Baum et al. |
| 5,583,862 A | 12/1996 | Callon |
| 5,583,922 A | 12/1996 | Davis et al. |
| 5,590,188 A | 12/1996 | Crockett |
| 5,592,542 A | 1/1997 | Honda et al. |
| 5,592,543 A | 1/1997 | Smith et al. |
| 5,594,791 A | 1/1997 | Szlam et al. |
| 5,598,532 A | 1/1997 | Liron |
| 5,604,737 A | 2/1997 | Iwami et al. |
| 5,606,602 A | 2/1997 | Johnson et al. |
| 5,608,778 A | 3/1997 | Partridge, III |
| 5,608,786 A | 3/1997 | Gordon |
| 5,610,910 A | 3/1997 | Focsaneanu et al. |
| 5,617,570 A | 4/1997 | Russell et al. |
| 5,619,183 A | 4/1997 | Ziegra et al. |
| 5,619,557 A | 4/1997 | Van Berkum |
| 5,619,648 A | 4/1997 | Canale et al. |
| 5,621,789 A | 4/1997 | McCalmont et al. |
| 5,621,790 A | 4/1997 | Grossman et al. |
| 5,623,600 A | 4/1997 | Ji et al. |
| 5,624,265 A | 4/1997 | Redford et al. |
| 5,625,404 A | 4/1997 | Grady et al. |
| 5,625,676 A | 4/1997 | Greco et al. |
| 5,625,682 A | 4/1997 | Gray et al. |
| 5,627,764 A | 5/1997 | Schutzman et al. |
| 5,627,884 A | 5/1997 | Williams et al. |
| 5,630,127 A | 5/1997 | Moore et al. |
| 5,632,011 A | 5/1997 | Landfield et al. |
| 5,633,920 A | 5/1997 | Kikinis et al. |
| 5,633,924 A | 5/1997 | Kaish et al. |
| 5,635,918 A | 6/1997 | Tett |
| 5,640,445 A | 6/1997 | David |
| 5,642,411 A | 6/1997 | Theis |
| 5,642,477 A | 6/1997 | de Carmo et al. |
| 5,642,511 A | 6/1997 | Chow et al. |
| 5,644,720 A | 7/1997 | Boll et al. |

(56) References Cited

U.S. PATENT DOCUMENTS

| | | |
|---|---|---|
| 5,646,981 A | 7/1997 | Klein |
| 5,649,105 A | 7/1997 | Aldred et al. |
| 5,652,785 A | 7/1997 | Richardson, Jr. et al. |
| 5,652,789 A | 7/1997 | Miner et al. |
| 5,652,791 A | 7/1997 | Sunderman et al. |
| 5,654,961 A | 8/1997 | Araujo et al. |
| 5,655,015 A | 8/1997 | Walsh et al. |
| 5,657,383 A | 8/1997 | Gerber et al. |
| 5,659,542 A | 8/1997 | Bell et al. |
| 5,659,604 A | 8/1997 | Beckmann |
| 5,659,746 A | 8/1997 | Bankert et al. |
| 5,673,304 A | 9/1997 | Connor et al. |
| 5,673,311 A | 9/1997 | Andruska et al. |
| 5,673,322 A | 9/1997 | Pepe et al. |
| 5,675,637 A | 10/1997 | Szlam et al. |
| 5,684,870 A | 11/1997 | Maloney et al. |
| 5,689,229 A | 11/1997 | Chaco et al. |
| 5,692,033 A | 11/1997 | Farris |
| 5,696,809 A | 12/1997 | Voit |
| 5,696,811 A | 12/1997 | Maloney et al. |
| 5,701,400 A | 12/1997 | Amado |
| 5,703,943 A | 12/1997 | Otto |
| 5,706,453 A | 1/1998 | Cheng et al. |
| 5,708,702 A | 1/1998 | De Paul et al. |
| 5,712,901 A | 1/1998 | Meermans |
| 5,715,306 A | 2/1998 | Sunderman et al. |
| 5,715,307 A | 2/1998 | Zazzera |
| 5,715,432 A | 2/1998 | Xu et al. |
| 5,717,747 A | 2/1998 | Boyle, III et al. |
| 5,721,770 A | 2/1998 | Kohler |
| 5,724,412 A | 3/1998 | Srinivasan |
| 5,724,418 A | 3/1998 | Brady |
| 5,726,984 A | 3/1998 | Kubler et al. |
| 5,727,159 A | 3/1998 | Kikinis |
| 5,729,594 A | 3/1998 | Klingman |
| 5,732,078 A | 3/1998 | Arango |
| 5,734,981 A | 3/1998 | Kennedy, III et al. |
| 5,737,495 A | 4/1998 | Adams et al. |
| 5,737,595 A | 4/1998 | Cohen et al. |
| 5,737,726 A | 4/1998 | Cameron et al. |
| 5,737,727 A | 4/1998 | Lehmann et al. |
| 5,740,238 A | 4/1998 | Flockhart et al. |
| 5,740,240 A | 4/1998 | Jolissaint |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,745,687 A | 4/1998 | Randell |
| 5,745,878 A | 4/1998 | Hashimoto et al. |
| 5,748,884 A | 5/1998 | Royce et al. |
| 5,748,907 A | 5/1998 | Crane |
| 5,751,706 A | 5/1998 | Land et al. |
| 5,751,707 A | 5/1998 | Voit et al. |
| 5,751,795 A | 5/1998 | Hassler et al. |
| 5,752,059 A | 5/1998 | Holleran et al. |
| 5,752,244 A | 5/1998 | Rose et al. |
| 5,752,246 A | 5/1998 | Rogers et al. |
| 5,754,111 A | 5/1998 | Garcia |
| 5,754,636 A | 5/1998 | Bayless et al. |
| 5,754,639 A | 5/1998 | Flockhart et al. |
| 5,754,655 A | 5/1998 | Hughes et al. |
| 5,757,904 A | 5/1998 | Anderson |
| 5,760,823 A | 6/1998 | Brunson et al. |
| 5,761,289 A | 6/1998 | Keshav |
| 5,764,736 A | 6/1998 | Shachar et al. |
| 5,764,898 A | 6/1998 | Tsuji et al. |
| 5,765,033 A | 6/1998 | Miloslavsky |
| 5,768,360 A | 6/1998 | Reynolds et al. |
| 5,768,527 A | 6/1998 | Zhu et al. |
| 5,774,583 A | 6/1998 | Sasaki et al. |
| 5,778,060 A | 7/1998 | Otto |
| 5,778,178 A | 7/1998 | Arunachalam |
| 5,778,377 A | 7/1998 | Marlin et al. |
| 5,784,438 A | 7/1998 | Martinez |
| 5,784,451 A | 7/1998 | Smith, Jr. |
| 5,784,452 A | 7/1998 | Carney |
| 5,787,160 A | 7/1998 | Chaney et al. |
| 5,787,163 A | 7/1998 | Taylor et al. |
| 5,790,635 A | 8/1998 | Dezonno |
| 5,790,650 A | 8/1998 | Dunn et al. |
| 5,790,789 A | 8/1998 | Suarez |
| 5,790,798 A | 8/1998 | Beckett, II et al. |
| 5,793,857 A | 8/1998 | Barnes et al. |
| 5,793,861 A | 8/1998 | Haigh |
| 5,794,039 A | 8/1998 | Guck |
| 5,796,398 A | 8/1998 | Zimmer |
| 5,796,729 A | 8/1998 | Greaney et al. |
| 5,796,791 A | 8/1998 | Polcyn |
| 5,796,813 A | 8/1998 | Sonnenberg |
| 5,799,067 A | 8/1998 | Kikinis et al. |
| 5,799,297 A | 8/1998 | Goodridge et al. |
| 5,802,163 A | 9/1998 | Miloslavsky |
| 5,802,253 A | 9/1998 | Gross et al. |
| 5,802,283 A | 9/1998 | Grady et al. |
| 5,802,314 A | 9/1998 | Tullis et al. |
| 5,802,316 A | 9/1998 | Ito et al. |
| 5,802,493 A | 9/1998 | Sheflott et al. |
| 5,802,526 A | 9/1998 | Fawcett et al. |
| 5,805,587 A | 9/1998 | Norris et al. |
| 5,806,061 A | 9/1998 | Chaudhuri et al. |
| 5,809,128 A | 9/1998 | McMullin |
| 5,809,282 A | 9/1998 | Cooper et al. |
| 5,809,512 A | 9/1998 | Kato |
| 5,812,795 A | 9/1998 | Horovitz et al. |
| 5,813,014 A | 9/1998 | Gustman |
| 5,815,566 A | 9/1998 | Ramot et al. |
| 5,818,935 A | 10/1998 | Maa |
| 5,822,306 A | 10/1998 | Catchpole |
| 5,822,400 A | 10/1998 | Smith |
| 5,822,404 A | 10/1998 | Cave |
| 5,822,526 A | 10/1998 | Waskiewicz |
| 5,825,775 A | 10/1998 | Chin et al. |
| 5,825,862 A * | 10/1998 | Voit et al. ............... 379/142.16 |
| 5,825,869 A | 10/1998 | Brooks et al. |
| 5,825,870 A | 10/1998 | Miloslavsky |
| 5,826,040 A | 10/1998 | Fargher et al. |
| 5,826,269 A | 10/1998 | Hussey |
| 5,828,747 A | 10/1998 | Fisher et al. |
| 5,828,839 A | 10/1998 | Moncreiff |
| 5,831,611 A | 11/1998 | Kennedy et al. |
| 5,832,196 A | 11/1998 | Croslin et al. |
| 5,835,090 A | 11/1998 | Clark et al. |
| 5,835,583 A | 11/1998 | Hetz et al. |
| 5,838,682 A | 11/1998 | Dekelbaum et al. |
| 5,838,768 A | 11/1998 | Sumar et al. |
| 5,838,773 A | 11/1998 | Eisner et al. |
| 5,838,774 A | 11/1998 | Weisser, Jr. |
| 5,841,854 A | 11/1998 | Schumacher et al. |
| 5,842,131 A | 11/1998 | Yamane |
| 5,844,980 A | 12/1998 | Patel et al. |
| 5,844,982 A | 12/1998 | Knitl |
| 5,847,484 A | 12/1998 | Kuyama et al. |
| 5,848,131 A | 12/1998 | Shaffer et al. |
| 5,848,143 A | 12/1998 | Andrews et al. |
| 5,850,433 A | 12/1998 | Rondeau |
| 5,852,814 A | 12/1998 | Allen |
| 5,857,184 A | 1/1999 | Lynch |
| 5,862,134 A | 1/1999 | Deng |
| 5,862,211 A | 1/1999 | Roush |
| 5,862,223 A | 1/1999 | Walker et al. |
| 5,864,616 A | 1/1999 | Hartmeier |
| 5,864,848 A | 1/1999 | Horvitz et al. |
| 5,867,484 A | 2/1999 | Shaunfield |
| 5,867,494 A | 2/1999 | Krishnaswamy et al. |
| 5,867,495 A | 2/1999 | Elliott et al. |
| 5,867,559 A | 2/1999 | Jorgensen et al. |
| 5,867,562 A | 2/1999 | Scherer |
| 5,867,822 A | 2/1999 | Sankar |
| 5,870,464 A | 2/1999 | Brewster et al. |
| 5,870,549 A | 2/1999 | Bobo, II |
| 5,872,841 A | 2/1999 | King et al. |
| 5,872,926 A | 2/1999 | Levac et al. |
| 5,873,032 A | 2/1999 | Cox et al. |
| 5,873,040 A | 2/1999 | Dunn et al. |

(56) References Cited

U.S. PATENT DOCUMENTS

| | | |
|---|---|---|
| 5,873,076 A | 2/1999 | Barr et al. |
| 5,878,126 A | 3/1999 | Velamuri et al. |
| 5,878,130 A | 3/1999 | Andrews et al. |
| 5,878,230 A | 3/1999 | Weber et al. |
| 5,881,146 A | 3/1999 | Hamilton |
| 5,883,891 A | 3/1999 | Williams et al. |
| 5,884,032 A | 3/1999 | Bateman et al. |
| 5,884,262 A | 3/1999 | Wise et al. |
| 5,887,173 A | 3/1999 | Ogawa et al. |
| 5,889,474 A | 3/1999 | LaDue |
| 5,889,774 A | 3/1999 | Mirashrafi et al. |
| 5,889,799 A | 3/1999 | Grossman et al. |
| 5,889,863 A | 3/1999 | Weber |
| 5,892,764 A | 4/1999 | Riemann et al. |
| 5,892,822 A | 4/1999 | Gottlieb et al. |
| 5,893,912 A | 4/1999 | Freund et al. |
| 5,894,512 A | 4/1999 | Zenner |
| 5,896,444 A | 4/1999 | Perlman et al. |
| 5,897,635 A | 4/1999 | Torres et al. |
| 5,901,138 A | 5/1999 | Bader et al. |
| 5,901,203 A | 5/1999 | Morganstein et al. |
| 5,901,209 A | 5/1999 | Tannenbaum et al. |
| 5,903,631 A | 5/1999 | Smith et al. |
| 5,903,877 A | 5/1999 | Berkowitz et al. |
| 5,905,495 A | 5/1999 | Tanaka et al. |
| 5,905,792 A | 5/1999 | Miloslavsky |
| 5,905,793 A | 5/1999 | Flockhart et al. |
| 5,905,863 A | 5/1999 | Knowles et al. |
| 5,907,547 A | 5/1999 | Foladare et al. |
| 5,911,134 A | 6/1999 | Castonguay et al. |
| 5,911,776 A | 6/1999 | Guck |
| 5,914,941 A | 6/1999 | Janky |
| 5,915,001 A | 6/1999 | Uppaluru |
| 5,915,008 A | 6/1999 | Dulman |
| 5,915,011 A | 6/1999 | Miloslavsky |
| 5,915,012 A | 6/1999 | Miloslavsky |
| 5,916,302 A | 6/1999 | Dunn et al. |
| 5,917,817 A | 6/1999 | Dunn et al. |
| 5,917,898 A | 6/1999 | Bassa et al. |
| 5,918,213 A | 6/1999 | Bernard et al. |
| 5,920,621 A | 7/1999 | Gottlieb |
| 5,920,719 A | 7/1999 | Sutton et al. |
| 5,920,865 A | 7/1999 | Ariga |
| 5,923,745 A | 7/1999 | Hurd |
| 5,923,879 A | 7/1999 | Sasmazel et al. |
| 5,926,535 A | 7/1999 | Reynolds |
| 5,926,538 A | 7/1999 | Deryugin et al. |
| 5,926,539 A | 7/1999 | Shtivelman |
| 5,933,492 A | 8/1999 | Turovski |
| 5,937,051 A | 8/1999 | Hurd et al. |
| 5,937,057 A | 8/1999 | Bell et al. |
| 5,937,162 A | 8/1999 | Funk et al. |
| 5,937,388 A | 8/1999 | Davis et al. |
| 5,938,725 A | 8/1999 | Hara |
| 5,940,075 A | 8/1999 | Mutschler, III et al. |
| 5,940,478 A | 8/1999 | Vaudreuil et al. |
| 5,940,479 A | 8/1999 | Guy et al. |
| 5,940,488 A | 8/1999 | DeGrazia et al. |
| 5,940,495 A | 8/1999 | Bondarenko et al. |
| 5,940,496 A | 8/1999 | Gisby et al. |
| 5,940,497 A | 8/1999 | Miloslavsky |
| 5,940,598 A | 8/1999 | Strauss et al. |
| 5,940,823 A | 8/1999 | Schreiber et al. |
| 5,943,416 A | 8/1999 | Gisby |
| 5,946,375 A | 8/1999 | Pattison et al. |
| 5,946,386 A * | 8/1999 | Rogers et al. ........... 379/265.09 |
| 5,946,387 A | 8/1999 | Miloslavsky |
| 5,948,054 A | 9/1999 | Nielsen |
| 5,949,988 A | 9/1999 | Feisullin et al. |
| 5,953,332 A | 9/1999 | Miloslavsky |
| 5,953,405 A | 9/1999 | Miloslavsky |
| 5,953,406 A | 9/1999 | LaRue et al. |
| 5,956,482 A | 9/1999 | Agraharam et al. |
| 5,956,729 A | 9/1999 | Goetz et al. |
| 5,958,014 A | 9/1999 | Cave |
| 5,958,016 A | 9/1999 | Chang et al. |
| 5,958,064 A | 9/1999 | Judd et al. |
| 5,959,982 A | 9/1999 | Federkins et al. |
| 5,960,073 A | 9/1999 | Kikinis et al. |
| 5,960,411 A | 9/1999 | Hartman et al. |
| 5,963,632 A | 10/1999 | Miloslavsky |
| 5,963,635 A | 10/1999 | Szlam et al. |
| 5,966,427 A | 10/1999 | Shaffer et al. |
| 5,966,695 A | 10/1999 | Melchione et al. |
| 5,970,065 A | 10/1999 | Miloslavsky |
| 5,970,134 A | 10/1999 | Highland et al. |
| 5,974,135 A | 10/1999 | Breneman et al. |
| 5,974,414 A | 10/1999 | Stanczak et al. |
| 5,974,444 A | 10/1999 | Konrad |
| 5,974,448 A | 10/1999 | Yamauchi et al. |
| RE36,416 E | 11/1999 | Szlam et al. |
| 5,978,465 A | 11/1999 | Corduroy et al. |
| 5,978,467 A | 11/1999 | Walker et al. |
| 5,978,672 A | 11/1999 | Hartmaier et al. |
| 5,978,836 A | 11/1999 | Ouchi |
| 5,982,774 A | 11/1999 | Foladare et al. |
| 5,982,870 A | 11/1999 | Pershan et al. |
| 5,982,873 A | 11/1999 | Flockhart et al. |
| 5,983,218 A | 11/1999 | Syeda-Mahmood |
| 5,987,102 A | 11/1999 | Elliott et al. |
| 5,987,117 A | 11/1999 | McNeil et al. |
| 5,987,118 A | 11/1999 | Dickerman et al. |
| 5,987,423 A | 11/1999 | Arnold et al. |
| 5,987,446 A | 11/1999 | Corey et al. |
| 5,991,365 A | 11/1999 | Pizano et al. |
| 5,991,390 A | 11/1999 | Booton |
| 5,991,391 A | 11/1999 | Miloslavsky |
| 5,991,392 A | 11/1999 | Miloslavsky |
| 5,991,393 A | 11/1999 | Kamen |
| 5,991,394 A | 11/1999 | Dezonno et al. |
| 5,991,395 A | 11/1999 | Miloslavsky |
| 5,995,606 A | 11/1999 | Civanlar et al. |
| 5,995,610 A | 11/1999 | Smidt et al. |
| 5,995,614 A | 11/1999 | Miloslavsky |
| 5,995,615 A | 11/1999 | Miloslavsky |
| 5,996,000 A | 11/1999 | Shuster |
| 5,999,525 A | 12/1999 | Krishnaswamy et al. |
| 5,999,609 A | 12/1999 | Nishimura |
| 5,999,965 A | 12/1999 | Kelly |
| 6,002,396 A | 12/1999 | Davies |
| 6,002,760 A | 12/1999 | Gisby |
| 6,003,034 A | 12/1999 | Tuli |
| 6,005,845 A | 12/1999 | Svennesson et al. |
| 6,005,920 A | 12/1999 | Fuller et al. |
| 6,009,163 A | 12/1999 | Nabkel et al. |
| 6,011,792 A | 1/2000 | Miloslavsky |
| 6,011,844 A | 1/2000 | Uppaluru et al. |
| 6,011,974 A | 1/2000 | Cedervall et al. |
| 6,012,152 A | 1/2000 | Douik et al. |
| 6,014,137 A | 1/2000 | Burns |
| 6,014,138 A | 1/2000 | Cain et al. |
| 6,014,379 A | 1/2000 | White et al. |
| 6,014,437 A | 1/2000 | Acker et al. |
| 6,014,647 A | 1/2000 | Nizzari et al. |
| 6,018,578 A | 1/2000 | Bondarenko et al. |
| 6,018,579 A | 1/2000 | Petrunka |
| 6,018,761 A | 1/2000 | Uomini |
| 6,021,262 A | 2/2000 | Cote et al. |
| 6,021,411 A | 2/2000 | Brophy et al. |
| 6,021,428 A | 2/2000 | Miloslavsky |
| 6,023,684 A | 2/2000 | Pearson |
| 6,023,723 A | 2/2000 | McCormick et al. |
| 6,026,087 A | 2/2000 | Mirashrafi et al. |
| 6,026,375 A | 2/2000 | Hall et al. |
| 6,028,917 A | 2/2000 | Creamer et al. |
| 6,029,195 A | 2/2000 | Herz |
| 6,038,293 A | 3/2000 | McNerney et al. |
| 6,038,537 A | 3/2000 | Matsuoka |
| 6,041,116 A | 3/2000 | Meyers |
| 6,044,142 A | 3/2000 | Hammarstrom et al. |
| 6,044,144 A | 3/2000 | Becker et al. |
| 6,044,146 A | 3/2000 | Gisby et al. |
| 6,044,368 A | 3/2000 | Powers |
| 6,046,762 A | 4/2000 | Sonesh et al. |

(56) References Cited

U.S. PATENT DOCUMENTS

| | | |
|---|---|---|
| 6,047,060 A | 4/2000 | Fedorov et al. |
| 6,049,272 A | 4/2000 | Lee et al. |
| 6,049,547 A | 4/2000 | Fisher et al. |
| 6,049,779 A | 4/2000 | Berkson |
| 6,052,514 A | 4/2000 | Gill et al. |
| 6,055,307 A | 4/2000 | Behnke et al. |
| 6,055,308 A | 4/2000 | Miloslavsky et al. |
| 6,055,513 A | 4/2000 | Katz et al. |
| 6,058,163 A | 5/2000 | Pattison et al. |
| 6,058,389 A | 5/2000 | Chandra et al. |
| 6,058,435 A | 5/2000 | Sassin et al. |
| 6,061,054 A | 5/2000 | Jolly |
| 6,064,667 A | 5/2000 | Gisby et al. |
| 6,064,723 A | 5/2000 | Cohn et al. |
| 6,064,730 A | 5/2000 | Ginsberg |
| 6,064,973 A | 5/2000 | Smith et al. |
| 6,067,357 A | 5/2000 | Kishinsky et al. |
| 6,069,890 A | 5/2000 | White et al. |
| 6,070,142 A | 5/2000 | McDonough et al. |
| 6,070,144 A | 5/2000 | Ginsberg et al. |
| 6,072,864 A | 6/2000 | Shtivelman et al. |
| 6,073,105 A | 6/2000 | Sutcliffe et al. |
| 6,073,109 A | 6/2000 | Flores et al. |
| 6,073,124 A | 6/2000 | Krishnan et al. |
| 6,075,783 A | 6/2000 | Voit |
| 6,075,843 A | 6/2000 | Cave |
| 6,076,101 A | 6/2000 | Kamakura et al. |
| 6,076,105 A | 6/2000 | Wolff et al. |
| 6,076,109 A | 6/2000 | Kikinis |
| 6,078,581 A | 6/2000 | Shtivelman et al. |
| 6,078,583 A | 6/2000 | Takahara et al. |
| 6,081,591 A | 6/2000 | Skoog |
| 6,081,592 A | 6/2000 | Battle |
| 6,085,201 A | 7/2000 | Tso |
| 6,088,340 A | 7/2000 | Buchholz et al. |
| 6,088,696 A | 7/2000 | Moon et al. |
| 6,088,717 A | 7/2000 | Reed et al. |
| 6,094,479 A | 7/2000 | Lindeberg et al. |
| 6,094,673 A | 7/2000 | Dilip et al. |
| 6,097,792 A | 8/2000 | Thornton |
| 6,097,804 A | 8/2000 | Gilbert et al. |
| 6,097,938 A | 8/2000 | Paxson |
| 6,098,065 A | 8/2000 | Skillen et al. |
| 6,104,711 A | 8/2000 | Voit |
| 6,104,800 A | 8/2000 | Benson |
| 6,104,801 A | 8/2000 | Miloslavsky |
| 6,104,802 A | 8/2000 | Perlmutter |
| 6,108,688 A | 8/2000 | Nielsen |
| 6,108,704 A | 8/2000 | Hutton et al. |
| 6,108,711 A | 8/2000 | Beck et al. |
| 6,112,085 A | 8/2000 | Garner et al. |
| 6,115,742 A | 9/2000 | Franklin et al. |
| 6,118,865 A | 9/2000 | Gisby |
| 6,119,155 A | 9/2000 | Rossmann et al. |
| 6,119,167 A | 9/2000 | Boyle et al. |
| 6,122,364 A | 9/2000 | Petrunka et al. |
| 6,122,365 A | 9/2000 | Yegoshin |
| 6,122,632 A | 9/2000 | Botts et al. |
| 6,125,113 A | 9/2000 | Farris et al. |
| 6,125,126 A | 9/2000 | Hallenstål |
| 6,128,379 A | 10/2000 | Smyk |
| 6,128,603 A | 10/2000 | Dent et al. |
| 6,128,646 A | 10/2000 | Miloslavsky |
| 6,130,933 A | 10/2000 | Miloslavsky |
| 6,134,217 A | 10/2000 | Stiliadis et al. |
| 6,134,235 A | 10/2000 | Goldman et al. |
| 6,134,315 A | 10/2000 | Galvin |
| 6,134,318 A | 10/2000 | O'Neil |
| 6,134,530 A | 10/2000 | Bunting et al. |
| 6,137,870 A | 10/2000 | Scherer |
| 6,138,139 A | 10/2000 | Beck et al. |
| 6,141,345 A | 10/2000 | Goeddel et al. |
| 6,157,653 A | 12/2000 | Kline et al. |
| 6,157,655 A | 12/2000 | Shtivelman |
| 6,157,924 A | 12/2000 | Austin |
| 6,166,735 A | 12/2000 | Dom et al. |
| 6,167,395 A | 12/2000 | Beck et al. |
| 6,167,404 A | 12/2000 | Morcos et al. |
| 6,170,011 B1 | 1/2001 | Macleod Beck et al. |
| 6,173,052 B1 | 1/2001 | Brady |
| 6,173,316 B1 | 1/2001 | De Boor et al. |
| 6,175,562 B1 | 1/2001 | Cave |
| 6,175,563 B1 | 1/2001 | Miloslavsky |
| 6,175,564 B1 | 1/2001 | Miloslavsky et al. |
| 6,175,620 B1 | 1/2001 | Rouge et al. |
| 6,175,842 B1 | 1/2001 | Kirk et al. |
| 6,178,239 B1 | 1/2001 | Kishinsky et al. |
| 6,181,336 B1 | 1/2001 | Chiu et al. |
| 6,181,736 B1 | 1/2001 | McLaughlin et al. |
| 6,181,788 B1 | 1/2001 | Miloslavsky |
| 6,182,059 B1 | 1/2001 | Angotti et al. |
| 6,182,249 B1 | 1/2001 | Wookey et al. |
| 6,185,287 B1 | 2/2001 | Miloslavsky |
| 6,185,292 B1 | 2/2001 | Miloslavsky |
| 6,185,535 B1 | 2/2001 | Hedin et al. |
| 6,188,688 B1 | 2/2001 | Buskirk, Jr. |
| 6,192,250 B1 | 2/2001 | Buskens et al. |
| 6,195,357 B1 | 2/2001 | Polcyn |
| 6,198,738 B1 | 3/2001 | Chang et al. |
| 6,198,739 B1 | 3/2001 | Neyman et al. |
| 6,201,804 B1 | 3/2001 | Kikinis |
| 6,205,135 B1 | 3/2001 | Chinni et al. |
| 6,205,412 B1 | 3/2001 | Barskiy et al. |
| 6,212,178 B1 | 4/2001 | Beck et al. |
| 6,215,783 B1 | 4/2001 | Neyman |
| 6,219,045 B1 | 4/2001 | Leahy et al. |
| 6,219,413 B1 | 4/2001 | Burg |
| 6,222,919 B1 | 4/2001 | Hollatz et al. |
| 6,226,285 B1 | 5/2001 | Kozdon et al. |
| 6,229,524 B1 | 5/2001 | Chernock et al. |
| 6,229,888 B1 | 5/2001 | Miloslavsky |
| 6,230,197 B1 | 5/2001 | Beck et al. |
| 6,233,234 B1 | 5/2001 | Curry et al. |
| 6,233,616 B1 | 5/2001 | Reid |
| 6,243,092 B1 | 6/2001 | Okita et al. |
| 6,243,373 B1 | 6/2001 | Turock |
| 6,243,375 B1 | 6/2001 | Speicher |
| 6,243,379 B1 | 6/2001 | Veerina et al. |
| 6,243,713 B1 | 6/2001 | Nelson et al. |
| 6,249,807 B1 | 6/2001 | Shaw et al. |
| 6,253,129 B1 | 6/2001 | Jenkins et al. |
| 6,256,503 B1 | 7/2001 | Stephens |
| 6,259,692 B1 | 7/2001 | Shtivelman et al. |
| 6,259,774 B1 | 7/2001 | Miloslavsky |
| 6,259,786 B1 | 7/2001 | Gisby |
| 6,263,049 B1 | 7/2001 | Kuhn |
| 6,263,065 B1 | 7/2001 | Durinovic-Johri et al. |
| 6,263,066 B1 | 7/2001 | Shtivelman et al. |
| 6,263,359 B1 | 7/2001 | Fong et al. |
| 6,275,693 B1 | 8/2001 | Lin et al. |
| 6,278,976 B1 | 8/2001 | Kochian |
| 6,278,996 B1 | 8/2001 | Richardson et al. |
| 6,282,565 B1 | 8/2001 | Shaw et al. |
| 6,285,364 B1 | 9/2001 | Giordano, III et al. |
| 6,286,033 B1 | 9/2001 | Kishinsky et al. |
| 6,286,084 B1 | 9/2001 | Wexler et al. |
| 6,286,129 B1 | 9/2001 | Agarwal et al. |
| 6,289,094 B1 | 9/2001 | Miloslavsky |
| 6,292,181 B1 | 9/2001 | Banerjee et al. |
| 6,292,553 B1 | 9/2001 | Fellingham et al. |
| 6,295,353 B1 | 9/2001 | Flockhart et al. |
| 6,295,530 B1 | 9/2001 | Ritchie et al. |
| 6,298,041 B1 | 10/2001 | Packer |
| 6,301,480 B1 | 10/2001 | Kennedy, III et al. |
| 6,304,898 B1 | 10/2001 | Shiigi |
| 6,314,089 B1 | 11/2001 | Szlam et al. |
| 6,314,430 B1 | 11/2001 | Chang |
| 6,320,857 B1 | 11/2001 | Tonnby et al. |
| 6,320,951 B1 | 11/2001 | Shtivelman et al. |
| 6,324,276 B1 | 11/2001 | Uppaluru et al. |
| 6,330,323 B1 | 12/2001 | Gottlieb et al. |
| 6,330,426 B2 | 12/2001 | Brown et al. |
| 6,332,154 B2 | 12/2001 | Beck et al. |
| 6,332,163 B1 | 12/2001 | Bowman-Amuah |

(56) References Cited

U.S. PATENT DOCUMENTS

| | | |
|---|---|---|
| 6,333,980 B1 | 12/2001 | Hollatz et al. |
| 6,335,927 B1 | 1/2002 | Elliott et al. |
| 6,337,904 B1 | 1/2002 | Gisby |
| 6,339,593 B1 | 1/2002 | Kikinis |
| 6,343,281 B1 | 1/2002 | Kato |
| 6,345,290 B2 | 2/2002 | Okada et al. |
| 6,345,300 B1 | 2/2002 | Bakshi et al. |
| 6,345,305 B1 | 2/2002 | Beck et al. |
| 6,346,952 B1 | 2/2002 | Shtivelman |
| 6,347,085 B2 | 2/2002 | Kelly |
| 6,353,608 B1 | 3/2002 | Cullers et al. |
| 6,353,667 B1 | 3/2002 | Foster et al. |
| 6,359,981 B1 | 3/2002 | Neyman et al. |
| 6,362,838 B1 | 3/2002 | Szlam et al. |
| 6,363,411 B1 | 3/2002 | Dugan et al. |
| 6,366,575 B1 | 4/2002 | Barkan et al. |
| 6,366,586 B1 | 4/2002 | Christie |
| 6,366,651 B1 | 4/2002 | Griffith et al. |
| 6,366,658 B1 | 4/2002 | Bjornberg et al. |
| 6,366,663 B1 | 4/2002 | Bauer et al. |
| 6,366,925 B1 | 4/2002 | Meltzer et al. |
| 6,370,238 B1 | 4/2002 | Sansone et al. |
| 6,370,508 B2 | 4/2002 | Beck et al. |
| 6,370,567 B1 | 4/2002 | Ouchi |
| 6,373,836 B1 | 4/2002 | Deryugin et al. |
| 6,373,937 B1 | 4/2002 | Yegoshin |
| 6,377,568 B1 | 4/2002 | Kelly |
| 6,377,583 B1 | 4/2002 | Lyles et al. |
| 6,377,944 B1 | 4/2002 | Busey et al. |
| 6,377,975 B1 | 4/2002 | Florman |
| 6,381,640 B1 | 4/2002 | Beck et al. |
| 6,385,191 B1 | 5/2002 | Coffman et al. |
| 6,385,202 B1 | 5/2002 | Katseff et al. |
| 6,385,646 B1 | 5/2002 | Brown et al. |
| 6,389,007 B1 | 5/2002 | Shenkman et al. |
| 6,389,133 B1 | 5/2002 | Kamen |
| 6,393,018 B2 | 5/2002 | Miloslavsky |
| 6,393,122 B1 | 5/2002 | Belzile |
| 6,393,278 B1 | 5/2002 | Buchanan et al. |
| 6,393,481 B1 | 5/2002 | Deo et al. |
| 6,396,834 B1 | 5/2002 | Bonomi et al. |
| 6,396,919 B1 | 5/2002 | Shimada et al. |
| 6,400,725 B1 | 6/2002 | Ross |
| 6,401,066 B1 | 6/2002 | McIntosh |
| 6,401,094 B1 | 6/2002 | Stemp et al. |
| 6,407,996 B1 | 6/2002 | Witchalls |
| 6,407,999 B1 | 6/2002 | Olkkonen et al. |
| 6,408,064 B1 | 6/2002 | Fedorov et al. |
| 6,411,806 B1 | 6/2002 | Garner et al. |
| 6,418,146 B1 | 7/2002 | Miloslavsky |
| 6,418,199 B1 | 7/2002 | Perrone |
| 6,424,709 B1 | 7/2002 | Doyle et al. |
| 6,427,002 B2 | 7/2002 | Campbell et al. |
| 6,430,174 B1 | 8/2002 | Jennings et al. |
| 6,430,282 B1 | 8/2002 | Bannister et al. |
| 6,434,231 B2 | 8/2002 | Neyman et al. |
| 6,434,530 B1 | 8/2002 | Sloane et al. |
| 6,434,549 B1 | 8/2002 | Linetsky et al. |
| 6,442,242 B1 | 8/2002 | McAllister et al. |
| 6,442,247 B1 | 8/2002 | Garcia |
| 6,449,260 B1 | 9/2002 | Sassin et al. |
| 6,449,270 B1 | 9/2002 | Miloslavsky |
| 6,449,358 B1 | 9/2002 | Anisimov et al. |
| 6,449,646 B1 | 9/2002 | Sikora et al. |
| 6,452,609 B1 | 9/2002 | Katinsky et al. |
| 6,453,038 B1 | 9/2002 | McFarlane et al. |
| 6,453,341 B1 | 9/2002 | Miloslavsky |
| 6,456,615 B1 | 9/2002 | Kikinis |
| 6,456,619 B1 | 9/2002 | Sassin et al. |
| 6,459,697 B1 | 10/2002 | Neyman |
| 6,463,148 B1 | 10/2002 | Brady |
| 6,470,010 B1 | 10/2002 | Szviatovszki et al. |
| 6,470,080 B2 | 10/2002 | Perlmutter |
| 6,473,787 B2 | 10/2002 | Miloslavsky |
| 6,480,600 B1 | 11/2002 | Neyman et al. |
| 6,487,663 B1 | 11/2002 | Jaisimha et al. |
| 6,489,954 B1 | 12/2002 | Powlette |
| 6,490,350 B2 | 12/2002 | McDuff et al. |
| 6,493,353 B2 | 12/2002 | Kelly et al. |
| 6,493,433 B2 | 12/2002 | Clabaugh et al. |
| 6,493,447 B1 | 12/2002 | Goss et al. |
| 6,496,567 B1 | 12/2002 | Bjornberg et al. |
| 6,496,702 B1 | 12/2002 | Lockhart |
| 6,496,981 B1 | 12/2002 | Wistendahl et al. |
| 6,498,897 B1 | 12/2002 | Nelson et al. |
| 6,499,088 B1 | 12/2002 | Wexler et al. |
| 6,512,825 B1 | 1/2003 | Lindholm et al. |
| 6,515,996 B1 | 2/2003 | Tonnby et al. |
| 6,519,246 B1 | 2/2003 | Strahs |
| 6,519,617 B1 | 2/2003 | Wanderski et al. |
| 6,532,493 B1 | 3/2003 | Aviani, Jr. et al. |
| 6,535,492 B2 | 3/2003 | Shtivelman |
| 6,536,043 B1 | 3/2003 | Guedalia |
| 6,539,419 B2 | 3/2003 | Beck et al. |
| 6,546,405 B2 | 4/2003 | Gupta et al. |
| 6,549,539 B1 | 4/2003 | Neyman |
| 6,553,114 B1 | 4/2003 | Fisher et al. |
| 6,554,183 B1 | 4/2003 | Sticha et al. |
| 6,560,328 B1 | 5/2003 | Bondarenko et al. |
| 6,560,329 B1 | 5/2003 | Draginich et al. |
| 6,560,607 B1 | 5/2003 | Lassesen |
| 6,563,788 B1 | 5/2003 | Torba et al. |
| 6,567,854 B1 | 5/2003 | Olshansky et al. |
| 6,581,105 B2 | 6/2003 | Miloslavsky et al. |
| 6,594,269 B1 | 7/2003 | Polcyn |
| 6,597,685 B2 | 7/2003 | Miloslavsky et al. |
| 6,600,733 B2 | 7/2003 | Deng |
| 6,600,822 B2 | 7/2003 | Kamen |
| 6,603,762 B1 | 8/2003 | Kikinis |
| 6,603,854 B1 | 8/2003 | Judkins et al. |
| 6,611,498 B1 | 8/2003 | Baker et al. |
| 6,611,590 B1 | 8/2003 | Lu et al. |
| 6,614,780 B2 | 9/2003 | Hakim et al. |
| 6,614,781 B1 | 9/2003 | Elliott et al. |
| 6,625,139 B2 | 9/2003 | Miloslavsky et al. |
| 6,628,666 B1 | 9/2003 | Pickering et al. |
| 6,631,399 B1 | 10/2003 | Stanczak et al. |
| 6,633,910 B1 | 10/2003 | Rajan et al. |
| 6,650,747 B1 | 11/2003 | Bala et al. |
| 6,651,085 B1 | 11/2003 | Woods |
| 6,661,882 B1 | 12/2003 | Muir et al. |
| 6,668,286 B2 | 12/2003 | Bateman et al. |
| 6,678,718 B1 | 1/2004 | Khouri et al. |
| 6,681,010 B1 | 1/2004 | Anderson et al. |
| 6,687,241 B1 | 2/2004 | Goss |
| 6,690,788 B1 | 2/2004 | Bauer et al. |
| 6,693,893 B1 | 2/2004 | Ehlinger |
| 6,704,409 B1 | 3/2004 | Dilip et al. |
| 6,704,410 B1 | 3/2004 | McFarlane et al. |
| 6,704,411 B1 | 3/2004 | Nishidate |
| 6,707,903 B2 | 3/2004 | Burok et al. |
| 6,711,249 B2 | 3/2004 | Weissman et al. |
| 6,711,611 B2 | 3/2004 | Hanhan |
| 6,714,643 B1 | 3/2004 | Gargeya et al. |
| 6,718,032 B1 | 4/2004 | Vrenjak et al. |
| 6,718,366 B2 | 4/2004 | Beck et al. |
| 6,721,306 B1 | 4/2004 | Farris et al. |
| 6,731,626 B1 | 5/2004 | Neyman |
| 6,735,298 B2 | 5/2004 | Neyman et al. |
| 6,744,877 B1 | 6/2004 | Edwards |
| 6,744,878 B1 | 6/2004 | Komissarchik et al. |
| 6,748,211 B1 | 6/2004 | Isaac et al. |
| 6,751,210 B1 | 6/2004 | Shaffer et al. |
| 6,753,784 B1 | 6/2004 | Sznaider et al. |
| 6,754,181 B1 | 6/2004 | Elliott et al. |
| 6,760,322 B1 | 7/2004 | Fukuda et al. |
| 6,760,324 B1 | 7/2004 | Scott et al. |
| 6,760,428 B2 | 7/2004 | Foster |
| 6,760,727 B1 | 7/2004 | Schroeder et al. |
| 6,763,104 B1 | 7/2004 | Judkins et al. |
| 6,763,369 B1 | 7/2004 | Ytuarte et al. |
| 6,771,765 B1 | 8/2004 | Crowther et al. |
| 6,778,527 B1 | 8/2004 | Amin |
| 6,785,375 B1 | 8/2004 | Beddus et al. |

(56) References Cited

U.S. PATENT DOCUMENTS

| | | |
|---|---|---|
| 6,785,710 B2 | 8/2004 | Kikinis |
| 6,785,740 B1 | 8/2004 | Yoneda et al. |
| 6,788,779 B2 | 9/2004 | Ostapchuck |
| 6,798,771 B1 | 9/2004 | Low et al. |
| 6,801,520 B2 | 10/2004 | Philonenko |
| 6,801,928 B2 | 10/2004 | Nuestro |
| 6,804,346 B1 | 10/2004 | Mewhinney |
| 6,816,871 B2 | 11/2004 | Lee |
| 6,816,878 B1 | 11/2004 | Zimmers et al. |
| 6,845,154 B1 | 1/2005 | Cave et al. |
| 6,847,715 B1 | 1/2005 | Swartz |
| 6,847,825 B1 | 1/2005 | Duvall et al. |
| 6,850,602 B1 | 2/2005 | Chou |
| 6,850,614 B1 | 2/2005 | Collins |
| 6,859,529 B2 | 2/2005 | Duncan et al. |
| 6,865,267 B2 | 3/2005 | Dezonno |
| 6,868,391 B1 | 3/2005 | Hultgren |
| 6,874,119 B2 | 3/2005 | Macleod Beck et al. |
| 6,876,632 B1 | 4/2005 | Takeda |
| 6,879,586 B2 | 4/2005 | Miloslavsky et al. |
| 6,882,996 B2 | 4/2005 | Preisig et al. |
| 6,898,190 B2 | 5/2005 | Shtivelman et al. |
| 6,903,685 B1 | 6/2005 | Arndt et al. |
| 6,907,455 B1 | 6/2005 | Wolfe et al. |
| 6,910,072 B2 | 6/2005 | Macleod Beck et al. |
| 6,912,272 B2 | 6/2005 | Kirk et al. |
| 6,922,411 B1 | 7/2005 | Taylor |
| 6,922,689 B2 | 7/2005 | Shtivelman |
| 6,934,379 B2 | 8/2005 | Falcon et al. |
| 6,934,381 B1 | 8/2005 | Klein et al. |
| 6,944,272 B1 | 9/2005 | Thomas |
| 6,958,994 B2 | 10/2005 | Zhakov et al. |
| 6,965,914 B2 | 11/2005 | Dowling |
| 6,970,844 B1 | 11/2005 | Bierenbaum |
| 6,977,740 B1 | 12/2005 | Mandalia |
| 6,981,020 B2 | 12/2005 | Miloslavsky et al. |
| 6,985,478 B2 | 1/2006 | Pogossiants et al. |
| 6,985,943 B2 | 1/2006 | Deryugin et al. |
| 6,996,603 B1 | 2/2006 | Srinivasan |
| 7,006,614 B2 | 2/2006 | Feinberg et al. |
| 7,031,442 B1 | 4/2006 | Neyman et al. |
| 7,036,128 B1 | 4/2006 | Julia et al. |
| 7,039,176 B2 | 5/2006 | Borodow et al. |
| 7,039,857 B2 | 5/2006 | Beck et al. |
| 7,076,048 B2 | 7/2006 | Lee et al. |
| 7,079,641 B2 | 7/2006 | Ostapchuck |
| 7,080,092 B2 | 7/2006 | Upton |
| 7,088,814 B1 | 8/2006 | Shaffer et al. |
| 7,092,509 B1 | 8/2006 | Mears et al. |
| 7,106,850 B2 | 9/2006 | Campbell et al. |
| 7,110,523 B2 | 9/2006 | Gagle et al. |
| 7,110,525 B1 | 9/2006 | Heller et al. |
| 7,117,244 B2 | 10/2006 | Florman et al. |
| 7,120,700 B2 | 10/2006 | Macleod Beck et al. |
| 7,127,400 B2 | 10/2006 | Koch |
| 7,133,830 B1 | 11/2006 | Hoban et al. |
| 7,136,475 B1 | 11/2006 | Rogers et al. |
| 7,155,496 B2 | 12/2006 | Froyd et al. |
| 7,155,512 B2 | 12/2006 | Lean et al. |
| 7,159,224 B2 | 1/2007 | Sharma et al. |
| 7,167,924 B1 | 1/2007 | Symonds et al. |
| 7,184,747 B2 | 2/2007 | Bogat |
| 7,216,350 B2 | 5/2007 | Martin et al. |
| 7,221,377 B2 | 5/2007 | Okita et al. |
| 7,222,301 B2 | 5/2007 | Makagon et al. |
| 7,231,032 B2 | 6/2007 | Nevman et al. |
| 7,236,486 B2 | 6/2007 | Baker et al. |
| 7,242,760 B2 | 7/2007 | Shires |
| 7,245,711 B2 | 7/2007 | Margolis |
| 7,246,009 B2 | 7/2007 | Hamblen et al. |
| 7,254,219 B1 | 8/2007 | Hansen et al. |
| 7,254,641 B2 | 8/2007 | Broughton et al. |
| 7,263,372 B2 | 8/2007 | Lockhart |
| 7,263,671 B2 | 8/2007 | Hull et al. |
| 7,269,263 B2 | 9/2007 | Dedieu et al. |
| 7,272,627 B2 | 9/2007 | Petrovykh |
| 7,277,424 B1 | 10/2007 | Dowling |
| 7,277,536 B2 | 10/2007 | Ostapchuk |
| 7,277,916 B2 | 10/2007 | Nuestro |
| 7,283,519 B2 | 10/2007 | Girard |
| 7,336,649 B1 | 2/2008 | Huang |
| 7,363,228 B2 | 4/2008 | Wyss et al. |
| 7,372,956 B1 | 5/2008 | Kikinis et al. |
| 7,373,405 B2 | 5/2008 | Deryugin et al. |
| 7,373,410 B2 | 5/2008 | Monza et al. |
| 7,376,227 B2 | 5/2008 | Anisimov et al. |
| 7,376,431 B2 | 5/2008 | Niedermeyer |
| 7,401,112 B1 | 7/2008 | Matz et al. |
| 7,415,009 B2 | 8/2008 | Neyman |
| 7,418,094 B2 | 8/2008 | Golitsin et al. |
| 7,428,303 B2 | 9/2008 | Campbell et al. |
| 7,434,204 B1 | 10/2008 | Everingham et al. |
| 7,460,496 B2 | 12/2008 | Miloslavsky et al. |
| 7,496,640 B2 | 2/2009 | Hanhan |
| 7,535,479 B2 | 5/2009 | Okita et al. |
| 7,558,383 B2 | 7/2009 | Shtivelman et al. |
| 7,561,887 B2 | 7/2009 | Lockhart |
| 7,564,840 B2 | 7/2009 | Elliott et al. |
| 7,565,428 B2 | 7/2009 | Deryugin et al. |
| 7,609,829 B2 | 10/2009 | Wang et al. |
| 7,610,347 B2 | 10/2009 | Petrovykh |
| 7,619,996 B2 | 11/2009 | Miloslavsky et al. |
| 7,669,182 B2 | 2/2010 | Garcia |
| 7,672,998 B1 | 3/2010 | Haskins et al. |
| 7,706,520 B1 | 4/2010 | Waterson et al. |
| 7,715,332 B2 | 5/2010 | Miloslavsky et al. |
| 7,716,292 B2 | 5/2010 | Kikinis |
| 7,739,325 B1 | 6/2010 | Okita et al. |
| 7,764,231 B1 | 7/2010 | Karr et al. |
| 7,769,161 B1 | 8/2010 | Hession et al. |
| 7,779,067 B2 | 8/2010 | Beck et al. |
| 7,792,773 B2 | 9/2010 | McCord et al. |
| 7,808,977 B2 | 10/2010 | Kikinis |
| 7,823,167 B2 | 10/2010 | Makagon et al. |
| 7,853,717 B2 | 12/2010 | Petrovykh |
| 7,856,095 B2 | 12/2010 | Brown |
| 7,903,807 B2 | 3/2011 | Neyman et al. |
| 7,907,598 B2 | 3/2011 | Anisimov et al. |
| 7,929,978 B2 | 4/2011 | Lockhart |
| 7,957,401 B2 | 6/2011 | Zalenski et al. |
| 8,009,821 B1 | 8/2011 | Apparao et al. |
| 8,018,921 B2 | 9/2011 | Pogossiants et al. |
| 8,024,401 B1 | 9/2011 | Gurbani et al. |
| 8,031,698 B2 | 10/2011 | Neyman |
| 8,036,214 B2 | 10/2011 | Elliott et al. |
| 8,059,812 B1 | 11/2011 | Bundy |
| 8,068,598 B1 | 11/2011 | Russi et al. |
| 8,085,761 B2 | 12/2011 | Elliott et al. |
| 8,089,958 B2 | 1/2012 | Elliott et al. |
| 8,126,133 B1 | 2/2012 | Everingham et al. |
| 8,130,749 B2 | 3/2012 | Kikinis |
| 8,180,662 B2 | 5/2012 | Minert et al. |
| 8,180,666 B2 | 5/2012 | Minert et al. |
| 8,199,891 B2 | 6/2012 | Brown et al. |
| 8,209,207 B2 | 6/2012 | Minert et al. |
| 8,209,209 B2 | 6/2012 | Minert et al. |
| 8,223,948 B2 | 7/2012 | Minert et al. |
| 8,226,477 B1 | 7/2012 | Machado et al. |
| 8,254,404 B2 | 8/2012 | Rabenko et al. |
| 8,254,558 B2 | 8/2012 | Minert et al. |
| 8,270,421 B2 | 9/2012 | Elliott et al. |
| 8,275,111 B2 | 9/2012 | Golitsin et al. |
| 8,345,856 B1 | 1/2013 | Anisimov et al. |
| 8,351,595 B2 | 1/2013 | Peterson et al. |
| 8,358,769 B2 | 1/2013 | Neyman et al. |
| 8,395,994 B2 | 3/2013 | Stevenson et al. |
| 8,396,205 B2 | 3/2013 | Lowry et al. |
| 8,411,844 B1 | 4/2013 | Anisimov et al. |
| 8,693,347 B2 | 4/2014 | Elliott et al. |
| 9,002,920 B2 | 4/2015 | Deryugin et al. |
| RE45,583 E | 6/2015 | Lockhart |
| 9,118,781 B1 | 8/2015 | Kavulak et al. |
| 2001/0000458 A1 | 4/2001 | Shtivelman et al. |
| 2001/0001150 A1 | 5/2001 | Miloslavsky |

(56) References Cited

U.S. PATENT DOCUMENTS

| | | |
|---|---|---|
| 2001/0005382 A1 | 6/2001 | Cave et al. |
| 2001/0011366 A1 | 8/2001 | Beck et al. |
| 2001/0013041 A1 | 8/2001 | MacLeod Beck et al. |
| 2001/0014604 A1 | 8/2001 | Kingdon et al. |
| 2001/0023430 A1 | 9/2001 | Srinivasan |
| 2001/0023448 A1 | 9/2001 | Hanhan |
| 2001/0024497 A1 | 9/2001 | Campbell et al. |
| 2001/0025309 A1 | 9/2001 | MacLeod Beck et al. |
| 2001/0028649 A1 | 10/2001 | Pogossiants et al. |
| 2001/0029519 A1 | 10/2001 | Hallinan et al. |
| 2001/0037316 A1 | 11/2001 | Shiloh |
| 2001/0038624 A1 | 11/2001 | Greenberg et al. |
| 2001/0040887 A1 | 11/2001 | Shtivelman et al. |
| 2001/0042095 A1 | 11/2001 | Kim et al. |
| 2001/0043586 A1 | 11/2001 | Miloslavsky |
| 2001/0043589 A1 | 11/2001 | Kikinis |
| 2001/0044676 A1 | 11/2001 | MacLeod Beck et al. |
| 2001/0044828 A1 | 11/2001 | Kikinis |
| 2001/0054064 A1 | 12/2001 | Kannan |
| 2002/0001300 A1 | 1/2002 | Miloslavsky et al. |
| 2002/0012428 A1 | 1/2002 | Neyman et al. |
| 2002/0013150 A1 | 1/2002 | McKenna et al. |
| 2002/0019844 A1 | 2/2002 | Kurowski et al. |
| 2002/0019846 A1 | 2/2002 | Miloslavsky et al. |
| 2002/0025819 A1 | 2/2002 | Cetusic et al. |
| 2002/0035647 A1 | 3/2002 | Brown et al. |
| 2002/0037076 A1 | 3/2002 | Perlmutter |
| 2002/0041674 A1 | 4/2002 | Kamen |
| 2002/0054579 A1 | 5/2002 | Miloslavsky |
| 2002/0055853 A1 | 5/2002 | Macleod Beck et al. |
| 2002/0056000 A1 | 5/2002 | Albert Coussement |
| 2002/0057671 A1 | 5/2002 | Kikinis |
| 2002/0059164 A1 | 5/2002 | Shtivelman |
| 2002/0059374 A1 | 5/2002 | Nuestro |
| 2002/0060988 A1 | 5/2002 | Shtivelman |
| 2002/0062385 A1 | 5/2002 | Dowling |
| 2002/0064149 A1 | 5/2002 | Elliott et al. |
| 2002/0071529 A1 | 6/2002 | Nelkenbaum |
| 2002/0076031 A1 | 6/2002 | Falcon et al. |
| 2002/0078150 A1 | 6/2002 | Thompson et al. |
| 2002/0087648 A1 | 7/2002 | Petrovykh |
| 2002/0091726 A1 | 7/2002 | MacLeod Beck et al. |
| 2002/0095462 A1 | 7/2002 | Beck et al. |
| 2002/0097708 A1 | 7/2002 | Deng |
| 2002/0099738 A1 | 7/2002 | Grant |
| 2002/0101866 A1 | 8/2002 | Miloslavsky et al. |
| 2002/0101880 A1 | 8/2002 | Kim |
| 2002/0103998 A1 | 8/2002 | DeBruine |
| 2002/0105957 A1 | 8/2002 | Bondarenko et al. |
| 2002/0114278 A1 | 8/2002 | Coussement |
| 2002/0114441 A1 | 8/2002 | Coussement |
| 2002/0120719 A1 | 8/2002 | Lee et al. |
| 2002/0123899 A1 | 9/2002 | Hall et al. |
| 2002/0126678 A1 | 9/2002 | Kelly et al. |
| 2002/0126828 A1 | 9/2002 | Kamen |
| 2002/0131399 A1 | 9/2002 | Philonenko |
| 2002/0136167 A1 | 9/2002 | Steele et al. |
| 2002/0150311 A1 | 10/2002 | Lynn |
| 2002/0169834 A1 | 11/2002 | Miloslavsky et al. |
| 2002/0176404 A1 | 11/2002 | Girard |
| 2003/0002479 A1 | 1/2003 | Vortman et al. |
| 2003/0002652 A1 | 1/2003 | Neyman et al. |
| 2003/0002654 A1 | 1/2003 | Torba |
| 2003/0007621 A1 | 1/2003 | Graves et al. |
| 2003/0009530 A1 | 1/2003 | Philonenko et al. |
| 2003/0018702 A1 | 1/2003 | Broughton et al. |
| 2003/0018729 A1 | 1/2003 | Miloslavsky |
| 2003/0021259 A1 | 1/2003 | Miloslavsky et al. |
| 2003/0021406 A1 | 1/2003 | Ostapchuck |
| 2003/0026414 A1 | 2/2003 | Baker et al. |
| 2003/0037113 A1 | 2/2003 | Petrovykh |
| 2003/0043832 A1 | 3/2003 | Anisimov et al. |
| 2003/0051037 A1 | 3/2003 | Sundaram et al. |
| 2003/0055884 A1 | 3/2003 | Yuen et al. |
| 2003/0058884 A1 | 3/2003 | Kallner et al. |
| 2003/0084128 A1 | 5/2003 | Anderson et al. |
| 2003/0084349 A1 | 5/2003 | Friedrichs et al. |
| 2003/0088421 A1 | 5/2003 | Maes et al. |
| 2003/0097457 A1 | 5/2003 | Saran et al. |
| 2003/0099343 A1 | 5/2003 | Dezonno |
| 2003/0115353 A1 | 6/2003 | Deryugin et al. |
| 2003/0125048 A1 | 7/2003 | Lockhart |
| 2003/0135592 A1 | 7/2003 | Vetter et al. |
| 2003/0161296 A1 | 8/2003 | Butler et al. |
| 2003/0161448 A1 | 8/2003 | Parolkar et al. |
| 2003/0179729 A1 | 9/2003 | MacLeod Beck et al. |
| 2003/0212558 A1 | 11/2003 | Matula |
| 2003/0216923 A1 | 11/2003 | Gilmore et al. |
| 2003/0219029 A1 | 11/2003 | Pickett |
| 2003/0220875 A1 | 11/2003 | Lam et al. |
| 2003/0229529 A1 | 12/2003 | Mui et al. |
| 2004/0017797 A1 | 1/2004 | Chen et al. |
| 2004/0019638 A1 | 1/2004 | Makagon et al. |
| 2004/0030557 A1 | 2/2004 | Culy et al. |
| 2004/0047302 A1 | 3/2004 | Dezonno et al. |
| 2004/0064348 A1 | 4/2004 | Humenansky et al. |
| 2004/0081183 A1 | 4/2004 | Monza et al. |
| 2004/0083195 A1 | 4/2004 | McCord et al. |
| 2004/0083281 A1 | 4/2004 | Makagon et al. |
| 2004/0083479 A1 | 4/2004 | Bondarenko et al. |
| 2004/0083482 A1 | 4/2004 | Makagon et al. |
| 2004/0102977 A1 | 5/2004 | Metzler et al. |
| 2004/0107025 A1 | 6/2004 | Ransom et al. |
| 2004/0111269 A1 | 6/2004 | Koch |
| 2004/0120502 A1 | 6/2004 | Strathmeyer et al. |
| 2004/0169675 A1 | 9/2004 | Beck et al. |
| 2004/0179516 A1 | 9/2004 | Neyman |
| 2004/0181574 A1 | 9/2004 | Hanhan |
| 2004/0199580 A1 | 10/2004 | Zhakov et al. |
| 2004/0208134 A1 | 10/2004 | Neyman et al. |
| 2004/0208309 A1 | 10/2004 | Miloslavsky |
| 2004/0213400 A1 | 10/2004 | Golitsin et al. |
| 2004/0223490 A1 | 11/2004 | Donovan et al. |
| 2004/0264678 A1 | 12/2004 | Ostapchuck |
| 2004/0267892 A1 | 12/2004 | Kikinis |
| 2005/0013417 A1 | 1/2005 | Zimmers et al. |
| 2005/0033851 A1 | 2/2005 | Kikinis |
| 2005/0041678 A1 | 2/2005 | Nuestro |
| 2005/0128961 A1 | 6/2005 | Miloslavsky et al. |
| 2005/0147090 A1 | 7/2005 | MacLeod Beck et al. |
| 2005/0154792 A1 | 7/2005 | Deryugin et al. |
| 2005/0207559 A1 | 9/2005 | Shtivelman et al. |
| 2006/0029206 A1 | 2/2006 | Anisimov et al. |
| 2006/0034262 A1 | 2/2006 | Pogossiants et al. |
| 2006/0079250 A1 | 4/2006 | Lockhart |
| 2006/0080107 A1 | 4/2006 | Hill et al. |
| 2006/0095568 A1 | 5/2006 | Makagon et al. |
| 2006/0109976 A1 | 5/2006 | Sundaram et al. |
| 2006/0133594 A1 | 6/2006 | Neyman et al. |
| 2006/0153173 A1 | 7/2006 | Beck et al. |
| 2006/0209797 A1 | 9/2006 | Anisimov et al. |
| 2006/0210047 A1 | 9/2006 | Neyman et al. |
| 2006/0245421 A1 | 11/2006 | Ostapchuk |
| 2007/0002744 A1 | 1/2007 | Mewhinney et al. |
| 2007/0041525 A1 | 2/2007 | Tingley et al. |
| 2007/0041567 A1 | 2/2007 | Anisimov et al. |
| 2007/0071224 A1 | 3/2007 | Shtivelman et al. |
| 2007/0110043 A1 | 5/2007 | Girard |
| 2007/0127707 A1 | 6/2007 | Koser et al. |
| 2007/0143301 A1 | 6/2007 | Tran |
| 2007/0195940 A1 | 8/2007 | Miloslavsky et al. |
| 2007/0213073 A1 | 9/2007 | Lockhart |
| 2007/0274495 A1 | 11/2007 | Youd et al. |
| 2008/0002822 A1 | 1/2008 | Petrovykh |
| 2008/0013531 A1 | 1/2008 | Elliott et al. |
| 2008/0025295 A1 | 1/2008 | Elliott et al. |
| 2008/0043728 A1 | 2/2008 | Miloslavsky et al. |
| 2008/0043955 A1 | 2/2008 | Shtivelman et al. |
| 2008/0043975 A1 | 2/2008 | Miloslavsky et al. |
| 2008/0043977 A1 | 2/2008 | Neyman et al. |
| 2008/0046504 A1 | 2/2008 | Deryugin et al. |
| 2008/0046531 A1 | 2/2008 | Shtivelman et al. |
| 2008/0049731 A1 | 2/2008 | Kikinis |
| 2008/0049737 A1 | 2/2008 | Neyman |

(56) References Cited

U.S. PATENT DOCUMENTS

| | | |
|---|---|---|
| 2008/0049928 A1 | 2/2008 | Miloslavsky et al. |
| 2008/0049929 A1 | 2/2008 | Miloslavsky et al. |
| 2008/0062971 A1 | 3/2008 | Kikinis |
| 2008/0130844 A1 | 6/2008 | Hubbard et al. |
| 2008/0205378 A1 | 8/2008 | Wyss et al. |
| 2008/0222240 A1 | 9/2008 | Deryugin et al. |
| 2008/0285739 A1 | 11/2008 | Golitsin et al. |
| 2009/0089136 A1 | 4/2009 | Minert et al. |
| 2009/0089451 A1 | 4/2009 | Petrovykh |
| 2009/0227267 A1 | 9/2009 | Lockhart |
| 2009/0240346 A1 | 9/2009 | Cadigan, Jr. et al. |
| 2010/0106710 A1 | 4/2010 | Nishizawa et al. |
| 2010/0157979 A1 | 6/2010 | Anisimov et al. |
| 2010/0198930 A1 | 8/2010 | Kikinis |
| 2011/0099602 A1 | 4/2011 | Apparao et al. |
| 2011/0110363 A1 | 5/2011 | Anandani |
| 2011/0178946 A1 | 7/2011 | Minert et al. |
| 2011/0179304 A1 | 7/2011 | Peterson |
| 2011/0179398 A1 | 7/2011 | Peterson |
| 2011/0182418 A1 | 7/2011 | Anisimov et al. |
| 2012/0047266 A1 | 2/2012 | Minert |
| 2012/0066016 A1 | 3/2012 | Minert et al. |
| 2012/0177195 A1 | 7/2012 | Elliott et al. |
| 2012/0195415 A1 | 8/2012 | Wyss et al. |
| 2012/0250849 A1 | 10/2012 | Liu et al. |
| 2013/0016115 A1 | 1/2013 | Minert et al. |
| 2013/0070757 A1 | 3/2013 | Elliott et al. |
| 2013/0129067 A1 | 5/2013 | Neyman et al. |
| 2013/0230160 A1 | 9/2013 | Neyman et al. |
| 2014/0376708 A1 | 12/2014 | Deryugin et al. |
| 2014/0379936 A1 | 12/2014 | Anisimov et al. |
| 2015/0201021 A1 | 7/2015 | Beck et al. |
| 2015/0244870 A1 | 8/2015 | Neyman et al. |

FOREIGN PATENT DOCUMENTS

| | | |
|---|---|---|
| AT | 316736 | 2/2006 |
| AT | 317621 | 2/2006 |
| AT | 318048 | 3/2006 |
| AT | 337678 | 9/2006 |
| AT | 379921 | 12/2007 |
| AT | 380434 | 12/2007 |
| AT | 384398 | 2/2008 |
| AT | 388578 | 3/2008 |
| AT | 401736 | 8/2008 |
| AT | 413059 | 11/2008 |
| AT | 424090 | 3/2009 |
| AT | 465451 | 5/2010 |
| AT | 474415 | 7/2010 |
| AU | 2604797 | 10/1997 |
| AU | 718233 B2 | 3/1998 |
| AU | 5274398 | 3/1998 |
| AU | 6023598 | 8/1998 |
| AU | 6034698 | 8/1998 |
| AU | 6167398 | 8/1998 |
| AU | 6319498 | 8/1998 |
| AU | 6655298 | 9/1998 |
| AU | 6655398 | 9/1998 |
| AU | 7099298 | 10/1998 |
| AU | 735134 B2 | 3/1999 |
| AU | 736449 B2 | 4/1999 |
| AU | 737483 B2 | 4/1999 |
| AU | 743217 B2 | 4/1999 |
| AU | 745404 B2 | 4/1999 |
| AU | 748636 B2 | 4/1999 |
| AU | 9225198 | 4/1999 |
| AU | 9228098 | 4/1999 |
| AU | 9381998 | 4/1999 |
| AU | 9479298 | 4/1999 |
| AU | 743880 B2 | 5/1999 |
| AU | 1118899 | 5/1999 |
| AU | 740090 B2 | 6/1999 |
| AU | 743737 B2 | 6/1999 |
| AU | 744340 B2 | 6/1999 |
| AU | 1120099 | 6/1999 |
| AU | 1276799 | 6/1999 |
| AU | 1286299 | 6/1999 |
| AU | 741437 B2 | 8/1999 |
| AU | 758713 B2 | 8/1999 |
| AU | 2595499 | 8/1999 |
| AU | 2595599 | 8/1999 |
| AU | 2667299 | 8/1999 |
| AU | 2674899 | 8/1999 |
| AU | 739979 B2 | 9/1999 |
| AU | 2674799 | 9/1999 |
| AU | 749023 B2 | 12/1999 |
| AU | 4427299 | 12/1999 |
| AU | 4819499 | 12/1999 |
| AU | 746085 B2 | 1/2000 |
| AU | 4426799 | 1/2000 |
| AU | 750215 B2 | 4/2000 |
| AU | 754238 B2 | 4/2000 |
| AU | 755234 B2 | 4/2000 |
| AU | 5807099 | 4/2000 |
| AU | 5810599 | 4/2000 |
| AU | 5813699 | 4/2000 |
| AU | 748456 B2 | 5/2000 |
| AU | 751143 B2 | 5/2000 |
| AU | 751232 B2 | 5/2000 |
| AU | 751269 B2 | 5/2000 |
| AU | 751301 B2 | 5/2000 |
| AU | 755138 B2 | 5/2000 |
| AU | 1233800 | 5/2000 |
| AU | 1327200 | 5/2000 |
| AU | 1328200 | 5/2000 |
| AU | 1328300 | 5/2000 |
| AU | 1454700 | 5/2000 |
| AU | 1717700 | 5/2000 |
| AU | 1718600 | 5/2000 |
| AU | 2045900 | 6/2000 |
| AU | 748447 B2 | 7/2000 |
| AU | 3113800 | 7/2000 |
| AU | 2964900 | 9/2000 |
| AU | 3470800 | 9/2000 |
| AU | 4507700 | 2/2001 |
| AU | 6798300 | 4/2001 |
| AU | 1077201 | 6/2001 |
| AU | 1077301 | 6/2001 |
| AU | 8006800 | 6/2001 |
| AU | 4732501 | 10/2001 |
| AU | 5384201 | 10/2001 |
| AU | 5724801 | 11/2001 |
| AU | 756656 B2 | 1/2003 |
| AU | 2003300117 | 8/2004 |
| BR | 9913621 A | 5/2001 |
| BR | 9913622 A | 5/2001 |
| CA | 2178705 A1 | 3/1997 |
| CA | 2391428 A1 | 3/1997 |
| CA | 2259912 C | 1/1998 |
| CA | 2280002 A1 | 8/1998 |
| CA | 2289193 A1 | 12/1998 |
| CA | 2289198 A1 | 12/1998 |
| CA | 2302397 A1 | 3/1999 |
| CA | 2302488 A1 | 3/1999 |
| CA | 2302674 A1 | 3/1999 |
| CA | 2302680 A1 | 3/1999 |
| CA | 2302704 A1 | 3/1999 |
| CA | 2302678 A1 | 4/1999 |
| CA | 2308590 A1 | 5/1999 |
| CA | 2309185 A1 | 5/1999 |
| CA | 2309186 A1 | 5/1999 |
| CA | 2309183 A1 | 6/1999 |
| CA | 2320978 A1 | 8/1999 |
| CA | 2320979 A1 | 8/1999 |
| CA | 2320989 A1 | 8/1999 |
| CA | 2330608 A1 | 12/1999 |
| CA | 2334513 A1 | 12/1999 |
| CA | 2343286 A1 | 3/2000 |
| CA | 2343288 A1 | 3/2000 |
| CA | 2343756 A1 | 3/2000 |
| CA | 2347721 A1 | 5/2000 |
| CA | 2348567 A1 | 5/2000 |
| CA | 2348574 A1 | 5/2000 |
| CA | 2348575 C | 5/2000 |

(56) References Cited

FOREIGN PATENT DOCUMENTS

| | | |
|---|---|---|
| CA | 2348994 A1 | 5/2000 |
| CA | 2348999 A1 | 5/2000 |
| CA | 2350515 A1 | 5/2000 |
| CA | 2352973 A1 | 6/2000 |
| CA | 2362172 A1 | 8/2000 |
| CA | 2313596 A1 | 2/2001 |
| CN | 1282484 A | 1/2001 |
| CN | 1282485 A | 1/2001 |
| CN | 1285990 A | 2/2001 |
| CN | 1285991 A | 2/2001 |
| CN | 1293798 A | 5/2001 |
| CN | 1293858 A | 5/2001 |
| CN | 1298590 A | 6/2001 |
| CN | 1309861 A | 8/2001 |
| CN | 1310822 A | 8/2001 |
| CN | 1323418 A | 11/2001 |
| CN | 1323421 A | 11/2001 |
| CN | 1354942 A | 6/2002 |
| CN | 1130061 C | 12/2003 |
| CN | 1132399 C | 12/2003 |
| CN | 1145314 C | 4/2004 |
| CN | 1149521 C | 5/2004 |
| CN | 1152549 C | 6/2004 |
| CN | 1512724 A | 7/2004 |
| CN | 1520197 A | 8/2004 |
| CN | 1197336 C | 4/2005 |
| CN | 1200548 C | 5/2005 |
| CN | 1662025 A | 8/2005 |
| CN | 1232077 C | 12/2005 |
| CN | 1756280 A | 4/2006 |
| CN | 100477702 C | 4/2009 |
| CN | 100547568 C | 10/2009 |
| CN | 102257789 A | 11/2011 |
| CN | 101635775 B | 12/2011 |
| DE | 60011863 T2 | 12/2004 |
| DE | 69730498 T2 | 9/2005 |
| DE | 60015236 T2 | 2/2006 |
| DE | 69832275 T2 | 8/2006 |
| DE | 69833285 T2 | 9/2006 |
| DE | 69833394 T2 | 10/2006 |
| DE | 69833462 T2 | 10/2006 |
| DE | 69833935 T2 | 11/2006 |
| DE | 60214191 T2 | 12/2006 |
| DE | 69834184 T2 | 3/2007 |
| DE | 69838795 T2 | 10/2008 |
| DE | 69838814 T2 | 11/2008 |
| DE | 69839022 T2 | 1/2009 |
| DE | 69839222 T2 | 3/2009 |
| EP | 0193961 A2 | 9/1986 |
| EP | 0236013 A2 | 9/1987 |
| EP | 0376517 A2 | 7/1990 |
| EP | 0420779 A2 | 4/1991 |
| EP | 0424015 A2 | 4/1991 |
| EP | 0425161 A2 | 5/1991 |
| EP | 0425163 A2 | 5/1991 |
| EP | 0515068 A2 | 11/1992 |
| EP | 0528732 A1 | 2/1993 |
| EP | 0532972 A1 | 3/1993 |
| EP | 0539105 A2 | 4/1993 |
| EP | 0559979 A2 | 9/1993 |
| EP | 0568770 A2 | 11/1993 |
| EP | 0610625 A2 | 8/1994 |
| EP | 0647050 A2 | 4/1995 |
| EP | 0647051 A1 | 4/1995 |
| EP | 0660573 A2 | 6/1995 |
| EP | 0701358 A1 | 3/1996 |
| EP | 0705017 A2 | 4/1996 |
| EP | 0721268 A2 | 7/1996 |
| EP | 0725526 A2 | 8/1996 |
| EP | 0734187 A2 | 9/1996 |
| EP | 0740450 A2 | 10/1996 |
| EP | 0748102 A2 | 12/1996 |
| EP | 0753956 A2 | 1/1997 |
| EP | 0755146 A2 | 1/1997 |
| EP | 0758175 A1 | 2/1997 |
| EP | 0771095 A2 | 5/1997 |
| EP | 0792076 A2 | 8/1997 |
| EP | 0806858 A2 | 11/1997 |
| EP | 0817455 A2 | 1/1998 |
| EP | 0856980 A2 | 8/1998 |
| EP | 0863651 A2 | 9/1998 |
| EP | 0866407 A1 | 9/1998 |
| EP | 0869639 A2 | 10/1998 |
| EP | 0883306 A2 | 12/1998 |
| EP | 0908047 A1 | 4/1999 |
| EP | 0958560 A1 | 11/1999 |
| EP | 0962087 A1 | 12/1999 |
| EP | 1006706 A2 | 6/2000 |
| EP | 1013062 A1 | 6/2000 |
| EP | 1013066 A1 | 6/2000 |
| EP | 1016280 A1 | 7/2000 |
| EP | 1044553 A1 | 10/2000 |
| EP | 1064630 A1 | 1/2001 |
| EP | 1066712 A1 | 1/2001 |
| EP | 1075153 A2 | 2/2001 |
| EP | 1087597 A2 | 3/2001 |
| EP | 1088277 A1 | 4/2001 |
| EP | 1092313 A1 | 4/2001 |
| EP | 1107555 A2 | 6/2001 |
| EP | 1114543 A1 | 7/2001 |
| EP | 1125214 A1 | 8/2001 |
| EP | 1133677 A2 | 9/2001 |
| EP | 1133736 A1 | 9/2001 |
| EP | 1133742 A1 | 9/2001 |
| EP | 1145153 A1 | 10/2001 |
| EP | 1145154 A1 | 10/2001 |
| EP | 1163564 A2 | 12/2001 |
| EP | 1193961 A2 | 4/2002 |
| EP | 1227635 A2 | 7/2002 |
| EP | 1248447 A2 | 10/2002 |
| EP | 1290861 A1 | 3/2003 |
| EP | 1292901 A1 | 3/2003 |
| EP | 1292939 A1 | 3/2003 |
| EP | 1328121 A1 | 7/2003 |
| EP | 0873642 B1 | 4/2004 |
| EP | 1413954 A2 | 4/2004 |
| EP | 1107615 B1 | 6/2004 |
| EP | 1033024 A4 | 9/2004 |
| EP | 1129545 A1 | 9/2004 |
| EP | 1061723 B1 | 10/2004 |
| EP | 1465397 A1 | 10/2004 |
| EP | 1469663 A1 | 10/2004 |
| EP | 1484903 A2 | 12/2004 |
| EP | 1566949 A1 | 8/2005 |
| EP | 0985308 B1 | 11/2005 |
| EP | 1359735 B1 | 1/2006 |
| EP | 1357729 B1 | 2/2006 |
| EP | 1377001 B1 | 2/2006 |
| EP | 0954922 B1 | 3/2006 |
| EP | 0986875 B1 | 4/2006 |
| EP | 1410614 B1 | 8/2006 |
| EP | 1774760 A2 | 4/2007 |
| EP | 1021905 B1 | 11/2007 |
| EP | 1031232 B1 | 12/2007 |
| EP | 1865697 A3 | 12/2007 |
| EP | 1040638 B1 | 1/2008 |
| EP | 1048162 B1 | 3/2008 |
| EP | 1157509 B1 | 7/2008 |
| EP | 1337079 B1 | 9/2008 |
| EP | 1326415 B1 | 10/2008 |
| EP | 1013054 B1 | 2/2009 |
| EP | 1333653 B1 | 4/2009 |
| EP | 0983676 B1 | 6/2009 |
| EP | 1125208 B1 | 4/2010 |
| EP | 1142284 B1 | 7/2010 |
| EP | 2380323 A1 | 10/2011 |
| EP | 1408678 B1 | 11/2011 |
| EP | 1057301 B1 | 8/2013 |
| EP | 1131728 B1 | 1/2014 |
| EP | 1625460 B1 | 5/2014 |
| ES | 2231120 T3 | 5/2005 |
| ES | 2255657 T3 | 7/2006 |
| ES | 2256666 T3 | 7/2006 |
| ES | 2257639 T3 | 8/2006 |

(56) References Cited

FOREIGN PATENT DOCUMENTS

| | | |
|---|---|---|
| FR | 2671252 A1 | 7/1992 |
| GB | 2273225 A | 6/1994 |
| GB | 2306853 A | 5/1997 |
| GB | 2315190 A | 1/1998 |
| GB | 2324627 A | 10/1998 |
| GB | 2369263 A | 5/2002 |
| JP | 64-7460 | 1/1969 |
| JP | 61-51247 | 3/1986 |
| JP | 62-200956 | 9/1987 |
| JP | 63-149955 | 6/1988 |
| JP | 64-77265 | 3/1989 |
| JP | 02-170756 | 7/1990 |
| JP | 02-298154 | 12/1990 |
| JP | 03-052443 | 3/1991 |
| JP | 03-160865 | 7/1991 |
| JP | 03-177144 | 8/1991 |
| JP | 04-40723 | 2/1992 |
| JP | 4-66858 | 6/1992 |
| JP | 04-265049 | 9/1992 |
| JP | 4-336742 | 11/1992 |
| JP | 04-371056 | 12/1992 |
| JP | 06-044157 | 2/1994 |
| JP | 06-046150 | 2/1994 |
| JP | 06-066830 | 3/1994 |
| JP | 06-069988 | 3/1994 |
| JP | 06-83771 | 3/1994 |
| JP | 06-90292 | 3/1994 |
| JP | 06-103058 | 4/1994 |
| JP | 06-121051 | 4/1994 |
| JP | 06-284203 | 7/1994 |
| JP | 06-261129 | 9/1994 |
| JP | 06-291877 | 10/1994 |
| JP | 06-334748 | 12/1994 |
| JP | 07-046321 | 2/1995 |
| JP | 07-058851 | 3/1995 |
| JP | 07-115471 | 5/1995 |
| JP | 07-170286 | 7/1995 |
| JP | 07-170546 | 7/1995 |
| JP | 07-212471 | 8/1995 |
| JP | 07-262104 | 10/1995 |
| JP | 07-319538 | 12/1995 |
| JP | 07-336447 | 12/1995 |
| JP | 08-46699 | 2/1996 |
| JP | 08-056377 | 2/1996 |
| JP | 08-163252 | 6/1996 |
| JP | 08-181793 | 7/1996 |
| JP | 08-504305 | 7/1996 |
| JP | 08-214076 | 8/1996 |
| JP | 08-214346 | 8/1996 |
| JP | 08-510071 | 10/1996 |
| JP | 8-321885 | 12/1996 |
| JP | 8-329118 | 12/1996 |
| JP | 8-331618 | 12/1996 |
| JP | 09-036963 | 2/1997 |
| JP | 09-501812 | 2/1997 |
| JP | 09-504394 | 4/1997 |
| JP | 09-149137 | 6/1997 |
| JP | 09-163031 | 6/1997 |
| JP | 09-224093 | 8/1997 |
| JP | 09-508508 | 8/1997 |
| JP | 09-233118 | 9/1997 |
| JP | 09-265408 | 10/1997 |
| JP | 10-11374 | 1/1998 |
| JP | 10-13811 | 1/1998 |
| JP | 10-51549 | 2/1998 |
| JP | 10-093713 | 4/1998 |
| JP | 10-093716 | 4/1998 |
| JP | 10-504425 | 4/1998 |
| JP | 10-116249 | 5/1998 |
| JP | 10-143451 | 5/1998 |
| JP | 10-506766 | 6/1998 |
| JP | 10-214113 | 8/1998 |
| JP | 10-224477 | 8/1998 |
| JP | 10-509847 | 9/1998 |
| JP | 10-304073 | 11/1998 |
| JP | 10-304074 | 11/1998 |
| JP | 10-327258 | 12/1998 |
| JP | 10-513632 | 12/1998 |
| JP | 11-055741 | 2/1999 |
| JP | 11-506292 | 6/1999 |
| JP | 11-183189 | 7/1999 |
| JP | 11-508430 | 7/1999 |
| JP | 11-508715 | 7/1999 |
| JP | 11-317817 | 11/1999 |
| JP | 11-512906 | 11/1999 |
| JP | 11-346266 | 12/1999 |
| JP | 2000-011005 | 1/2000 |
| JP | 2000-49847 | 2/2000 |
| JP | 2000-151819 | 5/2000 |
| JP | 2000-514985 | 11/2000 |
| JP | 2000-514986 | 11/2000 |
| JP | 2000-516432 | 12/2000 |
| JP | 2000-516795 | 12/2000 |
| JP | 2000-517142 | 12/2000 |
| JP | 2001-500677 | 1/2001 |
| JP | 2001-103533 | 4/2001 |
| JP | 2001-292236 | 10/2001 |
| JP | 2001-516993 | 10/2001 |
| JP | 2001-517027 | 10/2001 |
| JP | 2001-517029 | 10/2001 |
| JP | 2001-517038 | 10/2001 |
| JP | 2001-518754 | 10/2001 |
| JP | 2001-522201 | 11/2001 |
| JP | 2001-523930 | 11/2001 |
| JP | 3226929 B2 | 11/2001 |
| JP | 2001-524782 | 12/2001 |
| JP | 2001-526871 | 12/2001 |
| JP | 2002-503903 | 2/2002 |
| JP | 2002-503921 | 2/2002 |
| JP | 2002-504783 | 2/2002 |
| JP | 2002-518890 | 6/2002 |
| JP | 2002-519762 | 7/2002 |
| JP | 2002-525895 | 8/2002 |
| JP | 2002-528824 | 9/2002 |
| JP | 2002-529836 | 9/2002 |
| JP | 2002-529943 | 9/2002 |
| JP | 2002-529944 | 9/2002 |
| JP | 2002-529945 | 9/2002 |
| JP | 2002-529994 | 9/2002 |
| JP | 2002-530010 | 9/2002 |
| JP | 2002-534003 | 10/2002 |
| JP | 2002-537594 | 11/2002 |
| JP | 2003-502720 | 1/2003 |
| JP | 2003-507908 | 2/2003 |
| JP | 2003-510929 | 3/2003 |
| JP | 3384792 B2 | 3/2003 |
| JP | 3393119 B2 | 4/2003 |
| JP | 2003-516672 | 5/2003 |
| JP | 3453561 B2 | 10/2003 |
| JP | 3461488 B2 | 10/2003 |
| JP | 3516656 B2 | 4/2004 |
| JP | 3516659 B2 | 4/2004 |
| JP | 3547142 B2 | 7/2004 |
| JP | 3547397 B2 | 7/2004 |
| JP | 2004-312730 | 11/2004 |
| JP | 2005-504452 | 2/2005 |
| JP | 3615708 B2 | 2/2005 |
| JP | 3628962 B2 | 3/2005 |
| JP | 2005-094780 | 4/2005 |
| JP | 2005-102234 | 4/2005 |
| JP | 2005-124184 | 5/2005 |
| JP | 3681403 B2 | 8/2005 |
| JP | 3681406 B2 | 8/2005 |
| JP | 3686087 B2 | 8/2005 |
| JP | 3686337 B2 | 8/2005 |
| JP | 3735124 B2 | 1/2006 |
| JP | 3820151 | 9/2006 |
| JP | 2006-295947 | 10/2006 |
| JP | 3877523 B2 | 2/2007 |
| JP | 4057785 B2 | 3/2008 |
| JP | 4205310 B2 | 1/2009 |
| JP | 4234926 B2 | 3/2009 |
| JP | 4295186 B2 | 7/2009 |
| JP | 4450515 B2 | 4/2010 |

(56) References Cited

FOREIGN PATENT DOCUMENTS

| | | |
|---|---|---|
| JP | 2012-513725 | 6/2012 |
| KR | 10-2011-0098841 A | 9/2011 |
| WO | 9208194 A1 | 5/1992 |
| WO | 9401959 A1 | 1/1994 |
| WO | 9429995 A1 | 12/1994 |
| WO | 9508236 A2 | 3/1995 |
| WO | 9520860 A1 | 8/1995 |
| WO | 9533325 A2 | 12/1995 |
| WO | 9614704 A1 | 5/1996 |
| WO | 9620553 A2 | 7/1996 |
| WO | 9623265 A1 | 8/1996 |
| WO | 9627254 A1 | 9/1996 |
| WO | 9701917 A1 | 1/1997 |
| WO | 9712472 A1 | 4/1997 |
| WO | 9713352 A1 | 4/1997 |
| WO | 9716014 A2 | 5/1997 |
| WO | 9718662 A1 | 5/1997 |
| WO | 9720424 A1 | 6/1997 |
| WO | 9722201 A2 | 6/1997 |
| WO | 9723078 A1 | 6/1997 |
| WO | 9726749 A1 | 7/1997 |
| WO | 9728635 A1 | 8/1997 |
| WO | 9729584 A1 | 8/1997 |
| WO | 9734401 A1 | 9/1997 |
| WO | 9736414 A1 | 10/1997 |
| WO | 9737500 A1 | 10/1997 |
| WO | 9738389 A2 | 10/1997 |
| WO | 9738519 A1 | 10/1997 |
| WO | 9750235 A1 | 12/1997 |
| WO | 9801987 A1 | 1/1998 |
| WO | 9810573 A2 | 3/1998 |
| WO | 9813765 A1 | 4/1998 |
| WO | 9813974 A1 | 4/1998 |
| WO | 9817048 A1 | 4/1998 |
| WO | 9827479 A2 | 6/1998 |
| WO | 9831130 A1 | 7/1998 |
| WO | 9834390 A1 | 8/1998 |
| WO | 9835326 A1 | 8/1998 |
| WO | 9835509 A2 | 8/1998 |
| WO | 9836551 A1 | 8/1998 |
| WO | 9837481 A1 | 8/1998 |
| WO | 9837677 A2 | 8/1998 |
| WO | 9837686 A1 | 8/1998 |
| WO | 9837687 A1 | 8/1998 |
| WO | 9844699 A1 | 10/1998 |
| WO | 9844714 A1 | 10/1998 |
| WO | 9848577 A2 | 10/1998 |
| WO | 9854877 A2 | 12/1998 |
| WO | 9856133 A2 | 12/1998 |
| WO | 9856141 A1 | 12/1998 |
| WO | 9857501 A2 | 12/1998 |
| WO | 9900960 A1 | 1/1999 |
| WO | 9900966 A1 | 1/1999 |
| WO | 9903247 A2 | 1/1999 |
| WO | 9912367 A1 | 3/1999 |
| WO | 9913635 A1 | 3/1999 |
| WO | 9914919 A1 | 3/1999 |
| WO | 9914920 A1 | 3/1999 |
| WO | 9914924 A1 | 3/1999 |
| WO | 9914951 A1 | 3/1999 |
| WO | 9917518 A1 | 4/1999 |
| WO | 9923806 A1 | 5/1999 |
| WO | 9923807 A1 | 5/1999 |
| WO | 9926395 A1 | 5/1999 |
| WO | 9926424 A2 | 5/1999 |
| WO | 9927698 A1 | 6/1999 |
| WO | 9941720 A1 | 8/1999 |
| WO | 9941889 A2 | 8/1999 |
| WO | 9941891 A1 | 8/1999 |
| WO | 9941895 A1 | 8/1999 |
| WO | 9943137 A1 | 8/1999 |
| WO | 9925117 | 10/1999 |
| WO | 9956227 A1 | 11/1999 |
| WO | 9956229 A1 | 11/1999 |
| WO | 9965214 A1 | 12/1999 |
| WO | 9965252 A2 | 12/1999 |
| WO | 9967718 A1 | 12/1999 |
| WO | 0007332 A2 | 2/2000 |
| WO | 0016203 A1 | 3/2000 |
| WO | 0016207 A1 | 3/2000 |
| WO | 0016523 A1 | 3/2000 |
| WO | 0018094 A1 | 3/2000 |
| WO | 0025238 A1 | 5/2000 |
| WO | 0026804 A1 | 5/2000 |
| WO | 0026816 A1 | 5/2000 |
| WO | 0026817 A1 | 5/2000 |
| WO | 0027063 A2 | 5/2000 |
| WO | 0028425 A1 | 5/2000 |
| WO | 0028702 A1 | 5/2000 |
| WO | 0035173 A1 | 6/2000 |
| WO | 0038398 A1 | 6/2000 |
| WO | 0044159 A1 | 7/2000 |
| WO | 0049482 A2 | 8/2000 |
| WO | 0049778 A1 | 8/2000 |
| WO | 0113606 A1 | 2/2001 |
| WO | 0124025 A1 | 4/2001 |
| WO | 0140997 A1 | 6/2001 |
| WO | 0141372 A1 | 6/2001 |
| WO | 0143410 A1 | 6/2001 |
| WO | 0152513 A1 | 7/2001 |
| WO | 0180214 A1 | 10/2001 |
| WO | 0180540 A1 | 10/2001 |
| WO | 0184360 A1 | 11/2001 |
| WO | 02065741 A2 | 8/2002 |
| WO | 03010948 A1 | 2/2003 |
| WO | 2004063854 A2 | 7/2004 |
| WO | 2005036907 A1 | 4/2005 |
| WO | 2006055059 A2 | 5/2006 |
| WO | 2010075151 A1 | 7/2010 |

OTHER PUBLICATIONS

"Guide for the Use of Micro-Researcher II/SGR (Scroll Graph Section)," NEC Corporation, Third Edition, Chapters 1 & 5, Jul. 1995, 2 pages.
"Kana: Customer Messaging System," Kana Communications Sales Brochure, Palo Alto, CA, 1996, 12 pages.
"Latest Trend in CTI," Nikkei Communications, No. 248, Jun. 16, 1997, 14 pages.
"Method for Automatic Contextual Transposition Upon Receipt of Item of Specified Criteria," IBM Technical Disclosure Bulletin, vol. 37, No. 2B, Feb. 1994, 1 page.
"New Telephone Service Changing Computer Telephone Business," Nikkei Communications, Nov. 11, 1996, 7 pages.
"Single Line Suffices for Internet Telephone," Nikkei Communications, May 19, 1997, 9 pages.
"Solution Drivers/CTI, CTI Solution Strategy of Seven Computer Vendors, Toward Market Development of Mainly Bank, Insurance and Communications Markets," Computopia, Computer Age Co., Ltd., Japan, vol. 33, No. 379, 5 pages, Apr. 1998.
Bachmann, David W. et al., "NetMod: A Design Tool for Large-Scale Heterogeneous Campus Networks," Center for Information Technology Integration (CITI), The University of Michigan, Ann Arbor, MI, Jun. 15, 1990, 34 pages.
Bangun, H. et al., A Network Architecture for Multiuser Networked Games on Demand, International Conference on Information Communications and Signal Processing, ICICS '97, Sep. 9-12, 1997, 5 pages.
Beck, C. et al., Interactive process of operating system for multimedia communication center, Genesys Telecom Lab, Inc. 2014, 3 pages.
Bernett, Howard et al., "Assessing Web-Enabled Call Center Technologies," IT Pro, May/Jun. 2001, 7 pages.
Bertsekas, Dimitri et al., "Data Networks," Prentice-Hall, New Jersey, 1987, 5 pages.
Bickley, M. et al., Using Servers to Enhance Control System Capability, 1999 Particle Accelerator Conference, New York, NY, Mar. 29-Apr. 2, 1999, 3 pages.
Bradley, Kirk A. et al., "Detecting Disruptive Routers: A Distributed Network Monitoring Approach," Department of Computer Science, University of California, Davis, Sep. 1, 1998, 10 pages.

(56) References Cited

OTHER PUBLICATIONS

Canadian Office Action for Application No. 2,259,912, dated Nov. 19, 2001, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pages.
Canadian Office Action for Application No. 2308590, dated Jun. 28, 2002, 2 pages.
Canadian Office Action for Application No. 2309183, dated Jul. 23, 2002, 2 pages.
Canadian Office Action for Application No. 2320978, dated Jun. 2, 2003, 2 pages.
Canadian Office Action for Application No. 2320978, dated Sep. 26, 2002, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chan, Kevin F. et al., "Interactive Network Planning and Analysis on a Personal Computer," Computer Applications in Power, IEEE, vol. 3, No. 1, Jan. 1990, 5 pages.
Chau, Sam et al., "Intelligent Network Routing Using CCS7 and ISDN," Global Telecommunications Conference, vol. 3, 6 pages, 1990.
Chaudhuri, Surajit et al., "Optimizing Queries over Multimedia Repositories," Hewlett-Packard Laboratories, Stanford, Mar. 1996, 12 pages.
Chaum, David, "Untraceable Electronic Mail, Return Addresses, and Digital Pseudonyms," Communications of the ACM, vol. 24, No. 2, Feb. 1981, 8 pages.
Chew, T.-S. et al., "NETPLAN—a Telecommunications Network Planning Support System," TENCON '92, IEEE Region 10 International Conference, vol. 2, 7 pages, 1992.
Chinese Office Action for Application No. 200980151937.6, dated Jul. 1, 2013, 14 pages.
Chinese Office Action for Application No. 98812258.8 dated Jul. 26, 2002, 5 pages.
Chinese Office Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chinese Office action for Patent Application No. 200980151937.6, dated Feb. 15, 2015, 6 pages.
Chinese Office action with English Translation for Application No. 200980151937.6 dated May 23, 2014, 7 pages.
Chiu, H. et al., "Conferencing Metaphor," IBM Technical Disclosure Bulletin, vol. 36, No. 2, Feb. 1993, 4 pages.
Chou, Sheng-Lin., et al., "Computer Telephony Integration and Its Applications," IEEE Communications Surveys & Tutorials, vol. 3, No. 1, 2000, 10 pages.
Cordom, Christopher et al., "CONVERSANT VIS Listens and Talks to Your Customers," AT&T Technology, vol. 9, No. 2, 4 pages, 1994.
Curbera, Francisco et al., "Unraveling the Web Services Web: An Introduction to SOAP, WSDL, and UDDI," IEEE Internet Computing, 8 pages, Mar./Apr. 2002.

D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Eren, P. Erhan, et al., "Interactive Object-Based Analysis and Manipulation of Digital Video," IEEE Workshop on Multimedia Signal Processing, 1998, 6 pages.
Esesve, D.R., "Wireless Application Protocol (WAP)," Vitam College of Engineering, No Date Available, 12 pages, May 8, 2015.
European Office action Application No. 04011886.1, dated Mar. 9, 2007, 6 pages.
European Office action for Application No. 00115441.8, dated Feb. 11, 2004, 7 pages.
European Office action for Application No. 00115441.8, dated Mar. 15, 2005, 4 pages.
European Office Action for Application No. 00115441.8, dated May 18, 2006, 11 pages.
European Office Action for Application No. 00119160.0, dated Jan. 16, 2004, 6 pages.
European Office action for Application No. 00123329.5, dated Jun. 17, 2002, 6 pages.
European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03022831.6, dated Nov. 30, 2006, 7 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 97933327.5, dated Aug. 26, 2002, 4 pages.
European Office Action for Application No. 97933327.5, dated Feb. 7, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.
European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248,0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.
European Office Action for Application No, 98946907.7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.

(56) References Cited

OTHER PUBLICATIONS

European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958.6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123329.5, dated Jan. 30, 2002, 2 pages.
European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.
European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98903623.1, dated Apr. 17, 2002, 3 pages.
European Search Report for Application No. 98907371.3, dated Mar. 28, 2002, 3 pages.
European Search Report for Application No. 98924821.6, dated Jun. 13, 2002, 2 pages.
European Search Report for Application No. 98926248, dated Jul. 18, 2002, 3 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948163.5, dated Aug. 8, 2000, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.
European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732.4, dated Apr. 19, 2006, 4 pages.
European Search Report for Application No. 99956745.6, dated Jun. 30, 2005, 3 pages.
European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.

(56) References Cited

OTHER PUBLICATIONS

European Search Report for Application No. 99971602.0, dated Feb. 6, 2007, 3 pages.
Festa, Paul, "Vignette Updates StoryServer Platform," CNET News.com, Sep. 16, 1997, 4 pages.
Foster, Robin Harris, "Advanced DEFINITY Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter. et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Preliminary Examination Report for PCT/US01/13313, dated Apr. 22, 2002, 4 pages.
International Preliminary Examination Report for PCT/US01/40267, dated Dec. 9, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.
International Preliminary Examination Report for PCT/US98/02847, dated Jul. 9, 1999, 5 pages.
International Preliminary Examination Report for PCT/US98/13644, dated Jan. 12, 2000, 6 pages.
International Preliminary Examination Report for PCT/US98/18646, dated Oct. 30, 2000, 5 pages.
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/US99/25309, dated May 8, 2001, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US00/00781, dated Apr. 12, 2000, 2 pages.
International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US03/41677, dated Apr. 10, 2006, 1 page.
International Search Report for PCT/US05/27544, dated Jun. 14, 2006, 1 page.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated AugUst 19, 1998, 1 page.
International Search Report for PCT/US98/06334, dated Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.
International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.
International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.

(56) References Cited

OTHER PUBLICATIONS

International Search Report for PCT/US99/12700, mailed Nov. 30, 1999, 1 page.
International Search Report for PCT/US99/12781, mailed Sep. 9, 1999, 2 pages.
International Search Report for PCT/US99/12841, mailed Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, mailed Dec. 27, 1999, 5 pages.
Japanese Interrogation and Re-Examination Report for Application No. 1999-502827, mailed Oct. 26, 2004, 7 pages.
Japanese Office Action for Application No. 1997-527811, mailed Oct. 10, 2000, 6 pages.
Japanese Office Action for Application No. 1998-505335, mailed Mar. 5, 2002, 7 pages.
Japanese Office Action for Application No. 1998-531244, mailed Jan. 6, 2004, 4 pages.
Japanese Office Action for Application No. 1998-531244, mailed Sep. 10, 2002, 5 pages.
Japanese Office Action for Application No. 1998-536740, mailed Feb. 24, 2004, 5 pages.
Japanese Office Action for Application No. 1998-536740, mailed Sep. 3, 2002, 14 pages.
Japanese Office Action for Application No. 1999-500765, mailed Feb. 10, 2004, 6 pages.
Japanese Office Action for Application No. 1999-500765, mailed Sep. 3, 2002, 11 pages.
Japanese Office Action for Application No. 1999-502827, mailed Dec. 3, 2002, 4 pages.
Japanese Office Action for Application No. 1999-502827, mailed May 28, 2002, 3 pages.
Japanese Office Action for Application No. 1999-502827, mailed Nov. 1, 2005, 8 pages.
Japanese Office action for Application No. 2000-220082, mailed on Apr. 1, 2003, 3 pages.
Japanese Office Action for Application No. 2000-511299, mailed Feb. 3, 2004, 4 pages.
Japanese Office Action for Application No. 2000-511299, mailed May 16, 2006, 7 pages.
Japanese Office Action for Application No. 2000-512333, mailed Sep. 3, 2002, 6 pages.
Japanese Office Action for Application No. 2000-512334, mailed Sep. 10, 2002, 9 pages.
Japanese Office Action for Application No. 2000-512336, mailed Jul. 23, 2002, 8 pages.
Japanese Office Action for Application No. 2000-512336, mailed Jun. 24, 2003, 4 pages.
Japanese Office Action for Application No. 2000-514448, mailed Sep. 3, 2002, 10 pages.
Japanese Office Action for Application No. 2000-519541, dated May 16, 2005, 4 pages.
Japanese Office Action for Application No. 2000-519541, mailed Aug. 20, 2002, 10 pages.
Japanese Office Action for Application No. 2000-519541, mailed Dec. 2, 2003, 7 pages.
Japanese Office Action for Application No. 2000-519541, mailed Mar. 14, 2006, 6 pages.
Japanese Office Action for Application No. 2000-522718, mailed Sep. 10, 2002, 9 pages.
Japanese Office Action for Application No. 2000-531822, mailed Sep. 24, 2002, 6 pages.
Japanese Office Action for Application No. 2000-531940, mailed Dec. 3, 2002, 4 pages.
Japanese Office Action for Application No. 2000-532958, mailed Aug. 20, 2002, 7 pages.
Japanese Office Action for Application No. 2000-554115, dated Apr. 27, 2005, 5 pages.
Japanese Office Action for Application No. 2000-554115, mailed Jan. 6, 2004, 4 pages.
Japanese Office Action for Application No. 2000-554115, mailed Oct. 1, 2002, 5 pages.
Japanese Office Action for Application No. 2000-556311, mailed Oct. 21, 2003, 6 pages.
Japanese Office Action for Application No. 2000-570673, dated Oct. 4, 2005, 4 pages.
Japanese Office Action for Application No. 2000-570673, mailed Mar. 8, 2005, 6 pages.
Japanese Office Action for Application No. 2000-570673, mailed Oct. 14, 2003, 6 pages.
Japanese Office Action for Application No. 2000-570677, mailed May 11, 2004, 8 pages.
Japanese Office Action for Application No. 2000-570677, mailed Nov. 30, 2004, 10 pages.
Japanese Office Action for Application No. 2000-570941, mailed Oct. 7, 2003, 6 pages.
Japanese Office Action for Application No. 2000-578753, mailed May 11, 2004, 11 pages.
Japanese Office Action for Application No. 2000-580124, mailed Apr. 12, 2005, 6 pages.
Japanese Office Action for Application No. 2000-580124, mailed Oct. 7, 2003, 5 pages.
Japanese Office Action for Application No. 2000-580329, mailed Feb. 15, 2005, 8 pages.
Japanese Office Action for Application No. 2000-580329, mailed May 13, 2008, 8 pages.
Japanese Office Action for Application No. 2000-580329, mailed Oct. 4, 2005, 5 pages.
Japanese Office Action for Application No. 2000-581781, mailed Feb. 3, 2004, 4 pages.
Japanese Office Action for Application No. 2000-581781, mailed Oct. 8, 2002, 4 pages.
Japanese Office Action for Application No. 2000-590363, mailed Apr. 1, 2003, 6 pages.
Japanese Office Action for Application No. 2001-526724, mailed Aug. 1, 2006, 5 pages.
Japanese Office Action for Application No. 2001-526724, mailed Dec. 13, 2005, 5 pages.
Japanese Office Action for Application No. 2001-526724, mailed May 17, 2005, 4 pages.
Japanese Office Action for Application No. 2006-127262, mailed Jun. 1, 2010 (5 pages).
Japanese Office Action for Application No. 2006-127262, mailed Nov. 18, 2008 (7 pages).
Japanese Office Action for Application No. 2011-543586, mailed Jan. 24, 2013, 5 pages.
Japanese Office Action for Application No. 532950, dated Dec. 17, 2002, 6 pages.

(56) References Cited

OTHER PUBLICATIONS

Katz, Michael, "When CTI Meets the Internet," Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kaukonen, S., et al., "Agent-Based Conferencing Using Mobile IP-Telephony," Proceedings of Multimedia Signal Processing, 1999, 6 pages.
Korean Office Action for Application No. 10-2011-7016735, dated Jun. 13, 2013, 3 pages.
Korean Office Action for Application 10-2011-7017067, dated Aug. 21, 2012, 9 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, May 1996, 9 pages.
MacKay, Wendy E., et al., "Virtual Video Editing in Interactive Multimedia Applications," Communications of the ACM, vol. 32, No. 7, Jul. 1989, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Matsuo, Yasunori, "Microsoft Project for Windows 95," Nikkei Personal Computing, Nikkei Business Publications, Inc., No. 255, Dec. 18, 1995, 2 pages.
Mattison, Rob, "Data Warehousing and Data Mining for Telecommunications," Artech House, Boston, 1997, 7 pages.
Metz, Christopher, "IP Routers: New Tool for Gigabit Networking," On the Wire, IEEE Internet, Nov./Dec. 1998, 5 pages.
Microsoft Dictionary Pages, Microsoft Press, Redmond, WA, 1991, 2 pages.
Monson-Haefel, Richard, "Enterprise JavaBeans," O'Reilly & Assoc., 2nd Ed., 1999, 7 pages.
Murayama, Hideki, "Integrated Customer Supporting System View Workshop/CS, OA Business Personal Computer," NEC Business System, Denpa Press Co., Ltd., vol. 15, No. 12, Dec. 1997, 6 pages.
Nariani, Sushil, "Internet Telephony," Whatis.com, Oct. 25, 1999, 2 pages.
Newton's Telecom Dictionary, The Official Dictionary of Telcommunications & the Internet, 16th Edition, Telecom Books, Feb. 2000, 3 pages.
Newton, Harry, "Newton's Telecom Dictionary," Flatiron Publishing, New York, 1994, 7 pages.
Orozco-Barbosa, Luis et al., "Design and Performance Evaluation of Intelligent Multimedia Services," Computer Communications, vol. 20, 1997, 14 pages.
Padmanabhan, M., et al. Speech Recognition Performance on a Voicemail Transcription Task, IBM T.J. Watson Research Center, Yorktown Height, NY, 4 pages, May 8, 2015.
Rangan, P. Venkat, et al., "A Window-Based Editor for Digital Video and Audio," Proceedings of the 25th Hawaii International Conference on System Sciences, IEEE, vol. 2, Jan. 1992, 9 pages.

Recker, Mimi M. et al., "Predicting Document Access in Large, Multimedia Repositories," ACM Transactions on Computer-Human Interaction, vol. 3, 1994, 23 pages.
Rodriguez-Martinez, Manuel et al., "MOCHA: A Self-Extensible Database Middleware System for Distributed Data Sources," International Conference on Management Data—SIGMOD, 2000, 12 pages.
Rosenberg, Arthur M., "Call Center Computer Telephony: Technology Overview," Gartner, Inc., Jan. 1998 (24 pages).
Schmandt, Chris, "Phoneshell: The Telephone as Computer Terminal," Proceedings of ACM Multimedia Conference, 1993, 10 pages.
Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.
Semilof, Margie, "Call Centers Go On-Line," Communications Week, No Date Available, 2 pages, May 8, 2015.
Sevcik, Peter et al., "The Call Center Revolution," Northeast Consulting Technical Paper, Jan. 1, 1997, 12 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Supplemental European Search Report for Application No. 98908545.1, dated Sep. 5, 2002, 4 pages.
Szlam, Aleksander et al., "Predictive Dialing Fundamentals," Flatiron Publishing, New York, 1996, 28 pages.
Tadamura, Katsumi et al., "Synchronizing Computer Graphics Animation and Audio," IEEE, 1998, 11 pages.
Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.
Tang, Jingrong et al., "Advanced Service Architecture for H.323 Internet Protocol Telephony," Computer Communications, vol. 23, 2000, 14 pages.
Thio, Fu Wang et al., "Distributed Multimedia Database: A Design and Application Study," The Fourth International Conference on High Performance Computing in the Asia-Pacific Region, IEEE, Beijing, China, vol. 2, May 2000, 6 pages.
Toji, Ryutaro et al., "A Study of Customer Contact Operation System and Functions," Proceedings of the IECE General Conference, Comm. 2, Mar. 6, 1997, 3 pages.
Toji, Ryutaro et al., "OCN Multimedia Customer Contact System," NTT Technical Journal, The Telecommunication Association, Japan, vol. 10, No. 1, Jan. 1, 1998, 6 pages.
Tsunemasa, Mizuo., "CTI World 2: World of CTI," Business Communication, vol. 34, No. 2, Feb. 1, 1997, 13 pages.
Van Zijl, Lynette, et al., "A Tool for Graphical Network Modeling and Analysis," IEEE Software, Jan. 1992, 8 pages.
Vazquez, E., et al., Graphical Interface for Communication Network Analysis and Simulation, Department of Telematic Engineering, Technical University of Madrid, IEE, 1991, Spain, 4 pages.
Wagner, Susanne., "Intralingual Speech-to-Text Conversion in Real-Time: Challenges and Opportunities," Challenges of Multidimensional Translation Conference Proceedings, 2005, 10 pages.
Wang, Yong et al., "Real-time scheduling for multi-agent call center automation", Information service agents lab, school of computing science Simon Fraser University, Burnaby,BC Canada, 1999, 13 pages.
Wolter, Roger., "XML Web Services Basics," Microsoft Corporation, Dec. 2001, 4 pages.
Zenel, Bruce et al., Intelligent Communication Filtering for Limited Bandwidth Environments, Computer Science Department, Columnia University, IEEE, 1995, 7 pages.

\* cited by examiner

Sample of broadcast announcement record

PERSONAL DESKTOP ROUTER

CROSS REFERENCE TO RELATED APPLICATIONS

This application is a continuation of U.S. application Ser. No. 13/671,558, filed on Nov. 8, 2012, which is a continuation of U.S. application Ser. No. 11/926,542, filed Oct. 29, 2007 and issued as U.S. Pat. No. 8,358,769 on Jan. 22, 2013, which is a continuation of U.S. application Ser. No. 11/317, 946, filed Dec. 22, 2005 now abandoned, which is a divisional application of U.S. application Ser. No. 08/928,861, filed on Oct. 12, 1997 and issued as U.S. Pat. No. 7031442 on Apr. 18, 2006, which is a Continuation-In-Part (CIP) of U.S. application Ser. No. 08/869,815, filed on Jun. 4, 1997 and issued as U.S. Pat. No. 6,148,074 on Nov. 14, 2000, which is a CIP of U.S. application Ser. No. 08/802,667, filed on Feb. 19, 1997 and issued as U.S. Pat. No. 6,201,863 on Mar. 13, 2001 which is a CIP of U.S. application Ser. No. 08/797,420, filed on Feb. 10, 1997 and issued as U.S. Pat. No. 6,185,291 on Feb 6, 2001. U.S. application Ser. No. 08/928,861 is also a CIP of U.S. application Ser. No. 08/833,340, filed on Apr. 03, 1997 and issued as U.S. Pat. No. 6,560,328 on May 6, 2003, and a CIP of U.S. application Ser. No. 08/891,675, filed on Jul. 9, 1997 and issued as U.S. Pat. No. 6,205,412 on Mar. 20, 2001. The content of all prior applications are incorporated herein by reference.

FIELD OF THE INVENTION

The present invention is in the area of telephone call processing and switching, and pertains more particularly to intelligent call-routing systems, and equipment and methods for customizing and Personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point- of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a method is provided for routing telephone calls at customer premises having a telephony switch, individual telephones connected to the telephony switch, and computer workstations including video display units (VDUs) connected on a local area network (LAN) also coupled to the telephony switch, wherein individual ones of the computer workstations are located proximate individual ones of the telephones. The method comprises steps of (a) receiving a telephone call at a telephony switch connected to telephones at individual telephones at the customer premises; (b) providing identifying data for the telephone call to a client-server router; (c) determining a routing for the call at one of the computer workstations by use of a client interface, and transmitting the routing determination to the client-server router via the LAN connection; and (d) routing the telephone call by the client-server router according to the determination transmitted to the client-server router via the LAN connection from the client interface application.

In some embodiments the client-server router executes on the telephony switch. In other embodiments it executes on a processor connected to the telephony switch by a CTI connection, and the processor is connected to the LAN. In some embodiments the user interface comprises an on-screen window providing editable script in a high-level language.

The router in preferred embodiments has router-rule portions dedicated to individual users, and an individual user, through one or more of the client interfaces executing on a computer workstation, may access the portion dedicated to that user, and edit the routing rules therein. The client interface may comprise a graphical user interface (GUI) having icons for indicating telephone calls received and for choices of disposition of telephone calls received, and may include steps for a user to precipitate actions in call routing by iconic drag-and-drop procedures.

In one aspect of the invention a method is provided in a customer premises telephone call-routing system having a telephony switch for switching received telephone calls to connected telephones, for individual customization of routing rules for the received telephone calls. This method comprises steps of (a) executing a client user interface on a computer workstation connected to a customer local area network (LAN), the LAN also coupled to a computerized telephony switch receiving the incoming telephone calls; (b) determining routing for the received telephone calls at the computer workstation using the client user interface; (c)

transmitting the routing determination to a client-server router executing on a processor coupled to the LAN; and (d) routing the received telephone calls by the router according to the transmitted routing determination.

In another aspect of the invention a client-server telephone call router system is provided for determining routing of incoming telephone calls in a customer premises telephone call switching system including a telephony switch connected to individual telephones and computer workstations proximate individual ones of the telephones, the computer workstations also interconnected on a local area network (LAN) coupled to the telephony switch. The router comprises a client user interface executable on one of the computer workstations, and adapted to provide functions for editing routing rules for individual specific users; and a client-server router executable on a processor coupled to the LAN, the client-server router having a list of routing rules with individual portions dedicated to the individual specific users. The client user interface is adapted to transmit edited routing rules to the client-server router, and the client-server router is adapted to alter routing rules in the individual portions associated with the individual specific users. In some embodiments the client-server router executes on the telephony switch. In others it executes on a processor connected to the LAN and connected to the telephony switch by a CTI connection.

In various embodiments the client-server call router and methods of practicing the invention provide for the first time in the art an ability for individual users of a customer premises equipment to control routing of incoming calls meant for the individual users.

BRIEF DESCRIPTION OF THE DRAWING FIGURES

DESCRIPTION OF THE PREFERRED EMBODIMENTS

Figure 1:
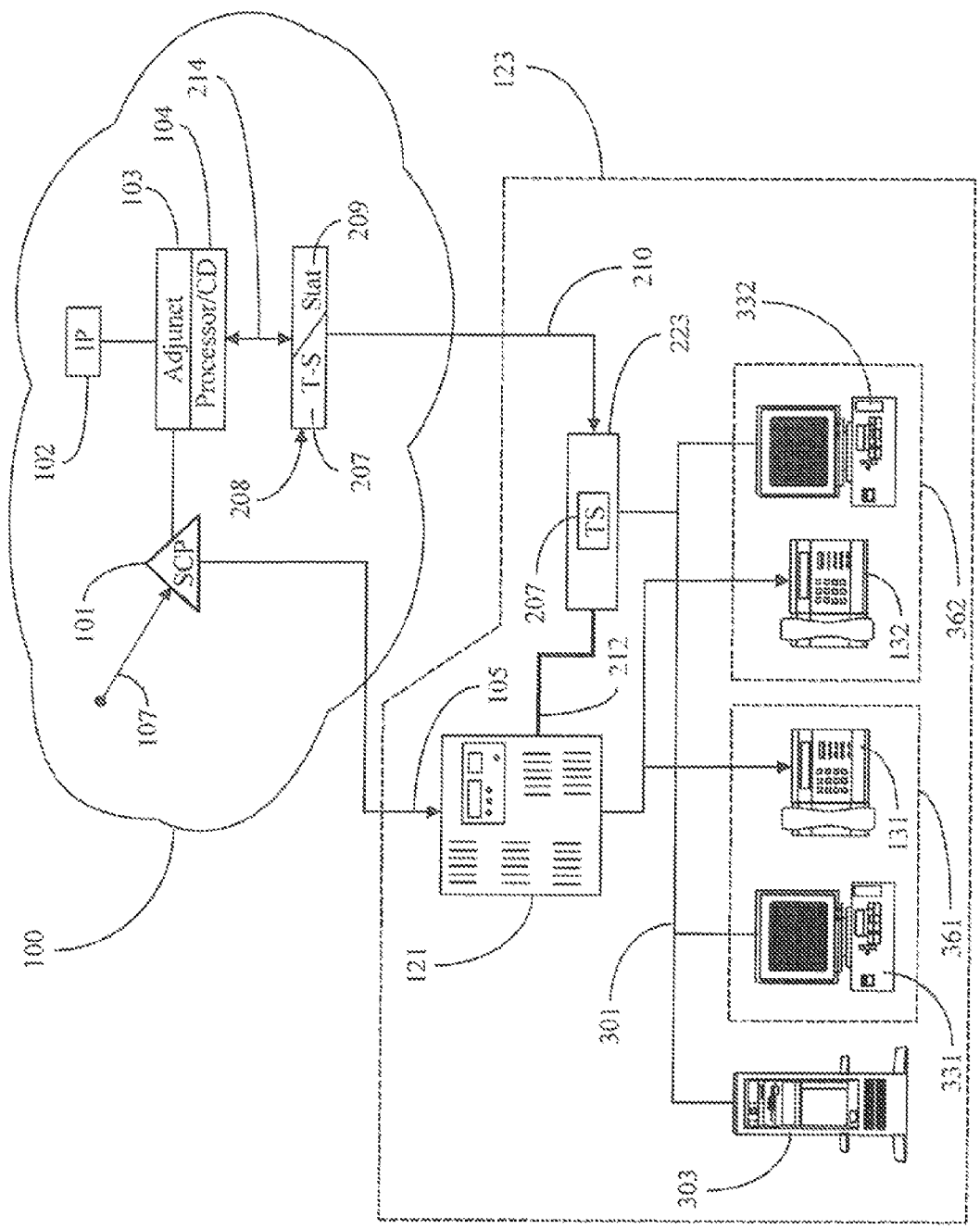
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony central switch 121 connected by a data link 212 to a processor 223 running an instance of a unique telephony server (T-Server) T-S 207. Switch 121 in conventional art distributes incoming calls (on line 105) to connected telephones, such as telephone 131 at a workstation 361 and telephone 132 at a second workstation 362. In various embodiments of the present invention T-Server 207 running on processor 223 exerts controlling influence on routing of incoming calls, as is described in further detail below.

In various embodiments of the present invention each workstation (361, 362) has a PC with a video display, such as PC/VDU 331 at workstation 361 and PC/VDU 332 at workstation 362. There will be in most architectures many more than the two telephone workstations shown, each with an associated PC, but two are considered adequate by the inventors to illustrate embodiments of the present invention.

PC/VDUs 331 and 332 in various embodiments are connected on a local area network (LAN) 301 which also connects to a data file server 303 and to processor 223 running an instance of T-Server 207. The arrangement of PC/VDU plus telephone at each workstation is a common arrangement for many company facilities, and has become more common as more and more people become computer literate. Moreover, many companies are actively training employees in use of computers, and providing PC-type computer equipment, usually interconnected by company LAN, for employees to use.

In the exemplary system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call at any point in network cloud 100 is represented by vector 107 to service control point (SCP) 101 (typically a telephony central switch), which in this example is connected to an adjunct processor 103 and coupled thereby to an intelligent peripheral (IP) 102, a distribution processor 104 and a processor 208 running a second instance of unique T-Server 207 as well as a statistical server (stat-server) 209. In this system calls are forwarded to switch 121 at the customer premises equipment over telephone line 105, and associated data is forwarded in parallel to processor 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In embodiments of the present invention a call originating in the network cloud and routed to switch 121, destined for one of telephones 131 or 132 or to another destination at the customer's premises, typically carries a destination number, which may include a direct inward dialing (DID) feature, whereby a limited number of lines may be used to carry calls to a larger number of final destinations, accomplished principally by software techniques. Destination may also be to a virtual number, of which many may be programmed, and T-Server 207 may be adapted to further route calls forwarded to such virtual numbers. The phone call may also have caller ID attached (originating caller's phone number), and in those cases wherein a separate network digital data link is accomplished between processors at the origination end (208) and the customer's premises (223) cases a data packet associated with the call may be forwarded over link 210. Also, T-S 207, which interacts continuously with switch 121 in this embodiment, is capable of transacting with data file server 303, given caller ID and/or other data associated with a call, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some pre-programmed protocol may also be involved. The simple diagram of a switch with two telephones connected is meant to be illustrative for description of embodiments of the present invention.

It will be apparent to those with skill in the art as well, that a separate processor shown as processor 223 in FIG. 1 is not strictly required in embodiments of the invention, depending on the level of machine intelligence and sophistication of switch 121. Switches for customer premises continue to be developed with new levels of intelligent capability, and some may be capable of interacting with other elements of the present invention without a separate processor between the switch and a LAN such as LAN 301. Processor 223 will be required to practice various embodiments of the invention with many existing telephony switches which may be used as element 121. In virtually all cases in practicing the present invention, an instance of unique T-Server 207 executing on a computerized platform will be required.

In a preferred embodiment of the present invention routing intelligence is no longer confined to a central location such as telephony switch 121 or T-Server 207 running on a connected processor, but distributed in a manner that individual users of the system may customize routing at their own workstations, using individual PCs. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PC/VDU 331 and PC/VDU 332 respectively. The location of stored code, and access to such code is not, however germane to the invention. In embodiments of the invention, an individual PC executes unique code to provide call-routing control for an individual.

In embodiments of the present invention, T-Server 207 is adapted to cooperate with code executed at individual PCs to route incoming calls. In this unique routing process there are at least two different mechanisms that may be used. In one mechanism, all calls are routed to a single routing point, and each individual routing application registers with that routing point. In this case a record of each call is broadcast on LAN 301, as will be described more fully below, and filtering occurs at each PC router. In a second mechanism there may be a virtual routing point for each PC using a personal router on the LAN. In this second case there is no need to broadcast call particulars on the LAN. This second alternative is typically more expensive than the first, and there are currently rather severe limitations on how many automatic call distribution (ACD) queues or routing points may be allocated on a typical central switch.

Figure 2:
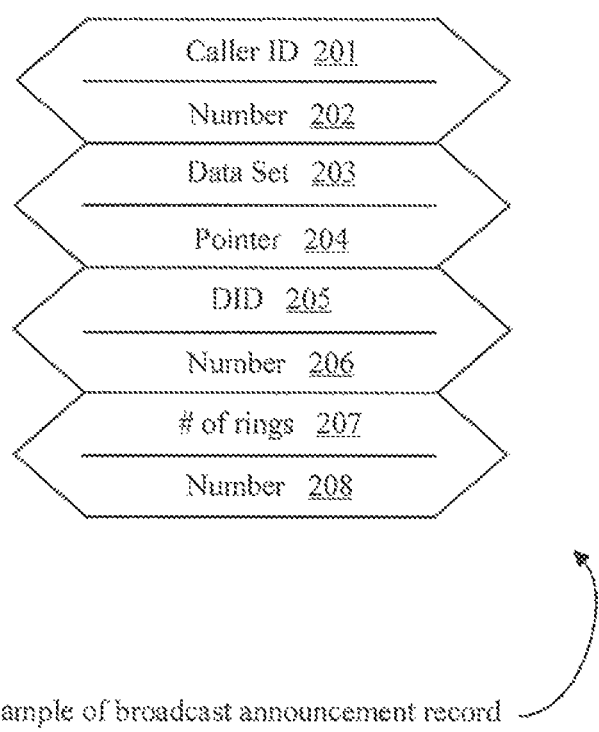
FIG. 2 is a sample of a broadcast announcement record in an embodiment of the present invention.

Referring now to FIG. 2, and presuming the first of the two mechanisms described immediately above, with each incoming call, an overall record of the call, prior to routing, is broadcast on LAN 301. This overall record can take a number of different forms, of which the example in FIG. 2 is just one exemplary form. In this example the overall record consists of four data portions. One data portion consists of elements 201 and 202. Data element 201 identifies this portion as the caller ID associated with the incoming call and element 202 is the caller ID number. A second data portion consists of data elements 203 and 204. This portion is a data set which may be transmitted via link 210 to processor 223 in parallel with the incoming call, or may be composed partly of data retrieved from server 303, using other call data as a pointer. Element 203 identifies the data as a data set, and element 204 is the pointer. Similarly elements 205 and 206 constitute a direct inward dialing (DID) number, and elements 207 and 208 fix number of rings.

A central element in the present invention is that a user at an individual PC runs an instance of a personal router application, providing that user with instant and complete control over routing of calls meant for that user (or, in some cases, associated users). The user's PC, such as PC/VDU 331 is connected typically by LAN to a processor such as processor 223, in turn connected to the central switch, such as switch 121.

At the computer portion of an individual workstation, such as PC/VDU 331 at workstation 361, the user has access to the local application which is interactive with code executed at T-Server 207 at processor 223, to control and customize routing for incoming calls, depending on certain data elements in the broadcast announcement record (FIG. 2). As a part of this unique capability to program routing responses, the individual user may in some embodiments load to his/her VDU a unique user interface, an example of which is shown in FIG. 3.

Figure 3:
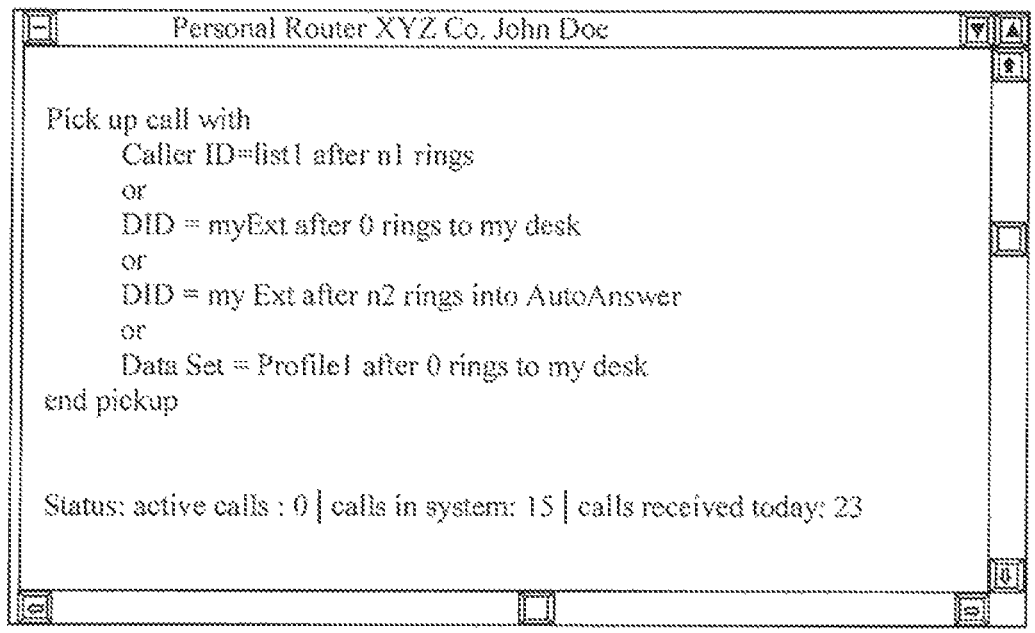
FIG. 3 is a sample user interface screen in an embodiment of the present invention.

FIG. 3 illustrates a window presentable to a user at an individual workstation, compatible, for example, with Windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. In the case where each user has a dedicated routing point, an incoming call is directed to the individual's computer, and the broadcast is not necessary.

In this example John Doe has programmed his interface to pick up all calls having Caller ID matched with a list "list1" after n1 rings. List1 is resident in John Doe's database associated with his own Personal Router, and John Doe may call up this list and amend, delete, and expand it as he wishes. The number of rings n1 may be any convenient number to accomplish John's purpose.

John Doe may program negative lists as well. Although not specifically recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface assigned have a computer at his/her elbow. For those persons not, for one reason or another, inclined to program their own routing, the interface may be called up and done by another, with appropriate access security applied. A secretary or system administrator may perform such functions, using any workstation connected to company LAN 301.

The user interface at the user's workstation can take any of a variety of forms, and have a variety of functionality. Typically, when the user logs on, his system will be configured to execute the unique application to run in the background, and to monitor for incoming calls at all times the user is present and active. It will be apparent to those with skill in the art that this can be done in a variety of ways. The interface, for example, may be a Graphic User Interface (GUI) wherein icons may be used to represent calls, callers, and other users, and the individual user at one workstation may select to display icons as desired. In this alternative embodiment an incoming call may appear on a user's PC VDU as a small telephone in an announcement bar. Such announcement bars are familiar to those with skill in the art, such as seen on Operating System Desktops, where an e-mail arrival may be indicated by a letter icon and a sound.

In such an embodiment, by moving the screen cursor to the telephone icon, which may be programmed to "ring" or to vibrate as though it is ringing, the user may activate a text balloon announcing the caller ID or other call data, or such data may be displayed directly in the icon. The system can be configured in such an embodiment to allow the user to route the call to his own phone with a click, to hang up with a double click, to drag the call to a holding queue (represented by a basket, for example,) to send the call to an answering machine, which may be done by dragging and dropping the telephone icon to an answering machine icon, to transfer the call to another person by dragging and dropping the telephone icon to an icon representing another user (such as the instant user's secretary or supervisor for example). Those with skill in the art will recognize that the functionality through the use of click and drag-and-drop procedures is very broad indeed.

Actions taken at the personal router interface at an individual PC on LAN 301 in embodiments of the present invention are codified as instructions on the LAN to T-Server 207 (in most cases) running on a processor such as processor 223, connected to central switch 121. If an individual user at a workstation, for example, has received an indicator of a waiting call, and has dragged the ringing telephone to his secretary's desk icon in his interface, his personal router interacts with T-Server 207 to instruct switch 121 to reroute the call to the secretary's telephone. In a similar manner, most actions at a personal router become instructions to switch 121, and in general each user having access to such a personal router can program responses to calls and respond to incoming calls in real time with a broad set of available responses.

In embodiments of the invention, not necessarily all calls are routed by personal routers executed on PCs on LAN 301. There may also be over-riding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-Server 207 running on processor 223, and individual workstations on the LAN is somewhat arbitrary, with the requirement that individuals at the workstations have interface access to customize and update personal routing rules.

In another aspect of the present invention a Personal Desktop Router is implemented in a Client-Server architecture. This embodiment is illustrated with the aid of FIG. 4. In this embodiment a router 401 is provided and executes on processor 223 which also executes an instance of T-Server 207. Router 401 in this instance is a central router having routing rules divided in sections dedicated to each assigned user or DN on LAN 301. Unique Client Interface Packages represented by elements 401*a* and 401*b* are provided at individual workstations such as workstation 361 and workstation 362 connected to LAN 301. Client Interface Packages 401*a* and 401*b* are for the purpose of allowing users at the workstations to edit their own personal routing rules, much as has been described above for personal routers according to embodiments of the present invention, wherein the routers execute at the workstations.

In this Client-Server embodiment of the present invention, the actual router software exists and executes as one router 401. Client Packages 410*a* and 410*b* may be implemented as a Graphical User Interface (GUI) with iconic drag and drop features as described above with reference to FIG. 1, or may be of another suitable type designed to allow interaction with router 401.

It will be apparent to one with skill in the art that router 401, in this embodiment, is not required to reside in processor 223, but may reside in any other machine capable of executing the router and connected or coupled to LAN 301, such as switch 121. The router could be executed, for example, on a server on the Internet, and accessed by a WEB browser by a client connected to LAN 301. It will also be apparent to one with skill in the art that while router function does not occur at individual workstations 361 and 362 in this particular embodiment, editing capabilities provided to the user via client packages 401*a* and 401*b* can remain essentially the same as described in previous embodiments taught herein.

In typical embodiments, router 401 is configured to allow a group manager or system agent to perform higher level configurations to routing rules, such as type of calls available, call parameters, user function or location changes, etc., while individual users may, through their interfaces, configure routing rules for their own calls, within the boundaries set by the supervisor.

It will be apparent to one with skill in the art that any configurational division of editing capabilities may be employed with reference to routing rules as they may exist in any given application without departing from the spirit and scope of the present invention. A server-based router such as router 401 in this embodiment, wherein a unique client package is provided for editing purposes at a user's workstation, such as workstation 361, is heretofore unknown to the inventor.

Figure 4:
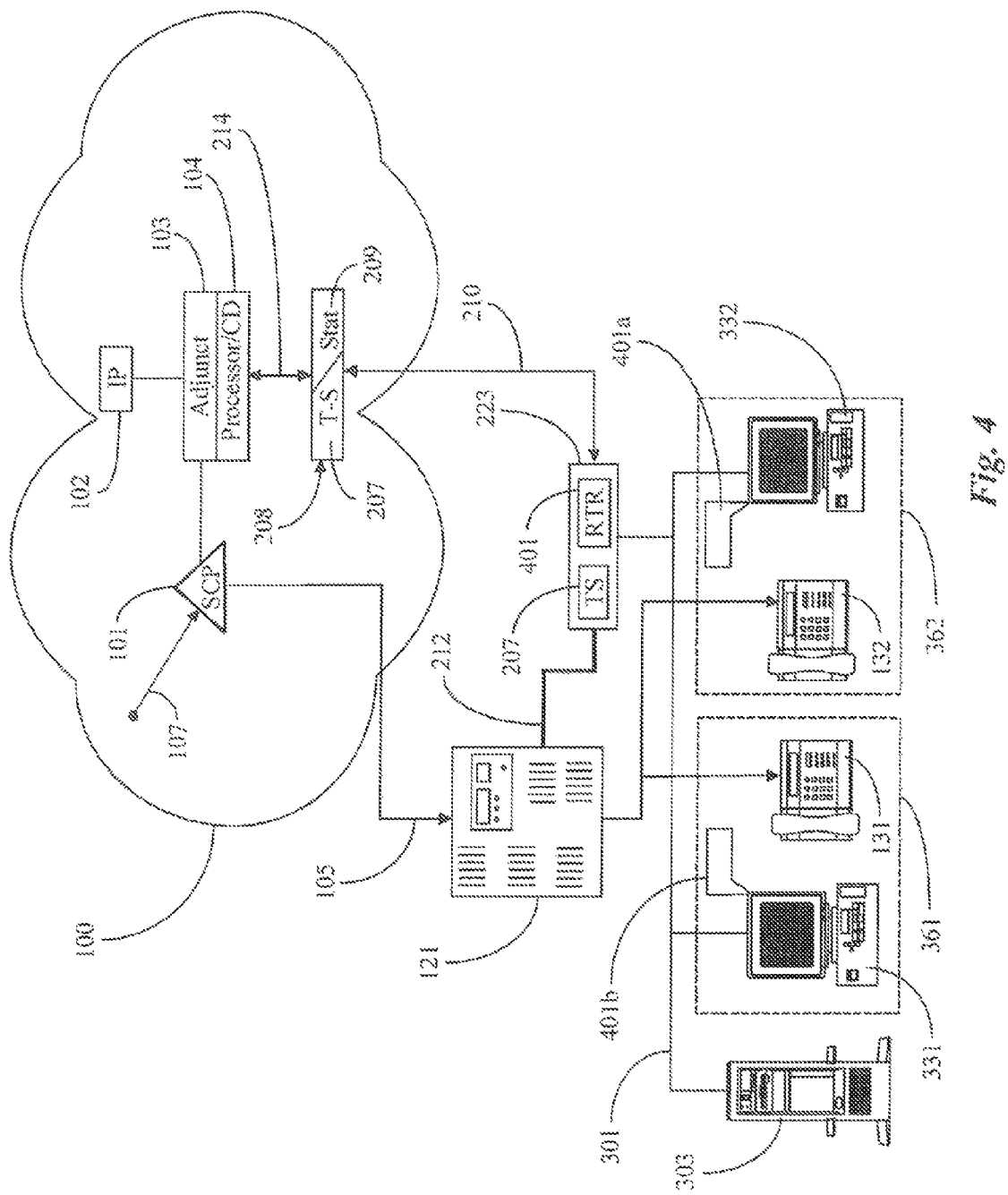
FIG. 4 is a system diagram of a call-routing system implemented in client-server mode in an embodiment of the present invention.

In the embodiment illustrated by FIG. 4 communication over analog lines 105 and data link 210, and other functions of the system, is essentially the same in method as is illustrated in FIG. 1 and described above with reference to FIG. 1. Also, network cloud 100 and the components therein are essentially the same as in the embodiment in FIG. 1. For this reason much detail as to the dynamics of and paths of communication in an embodiment of the present invention with respect to FIG. 4 are not repeated here.

Virtualized Computer-Telephony Integrated Link (3211-3213)

Figure 5:
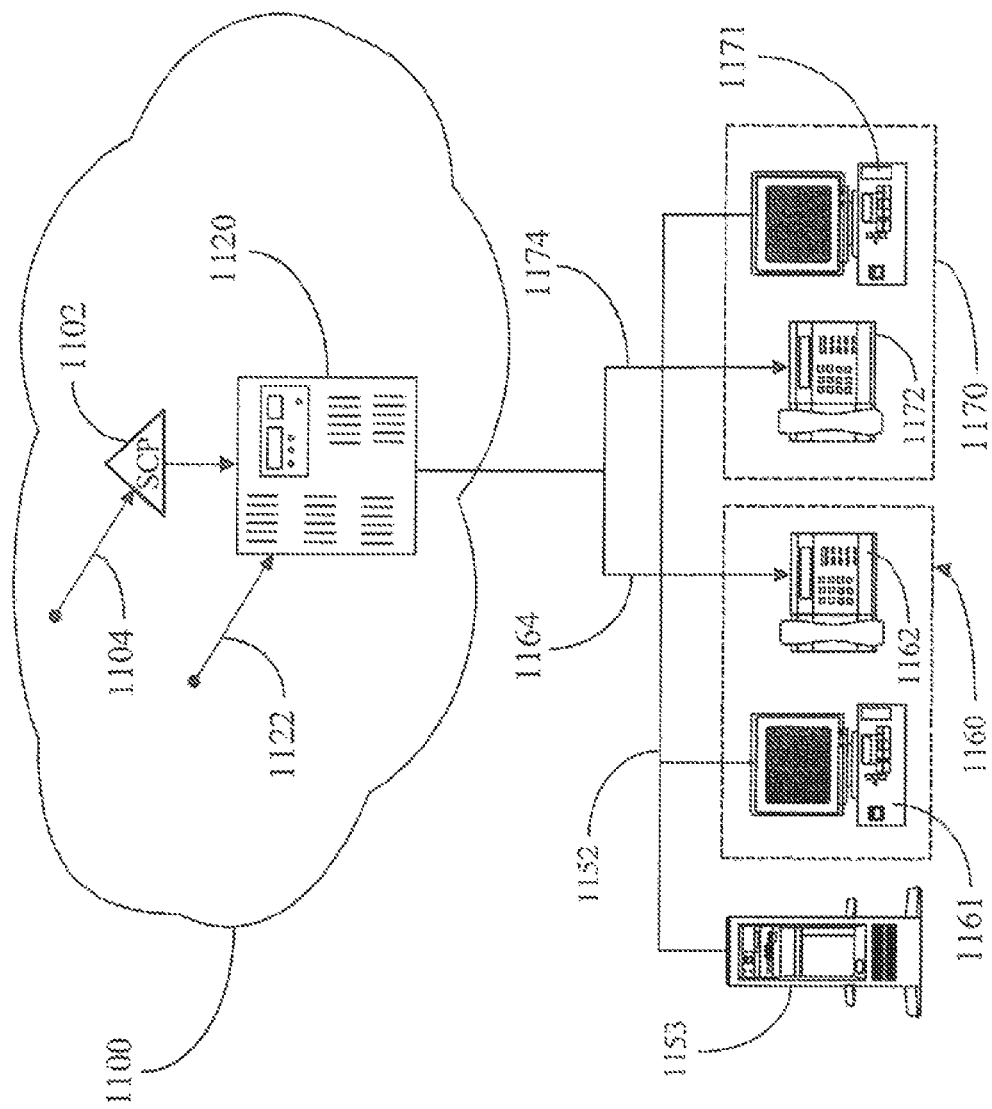
FIG. 5 is a block diagram of a call-routing system in the prior art.

To help create a context for a detailed description of preferred embodiments of the present invention which follow, attention is first directed to FIG. 5, which is a block diagram of a call-routing system in the prior art. In the system of FIG. 5 a call-in center 1150 is illustrated having two telephones 1162 and 1172. As was described above in the background section, the present invention is particularly adaptable to such call-in centers wherein a telephony switch is not a part of the equipment at the call-in center, thus no telephony switch is shown in FIG. 5 at call-in center 1150.

It will be apparent to those with skill in the art that there may be just one phone in call-in center, or there may be several more than the two shown. Two telephones is an arbitrary choice for purposes of illustration and description.

It is common and desirable at call-in centers for agents who man the phones to have at hand a personal computer (PC) or a data terminal of some description including a video display and processor. Access to such a computerized system allows the agent to recall and display data pertaining to a caller, and also other information of use in dealing with and helping caller, such as technical information about products and product use. Although several types of such data terminals are known, PCs are assumed here for purposes of description and illustration. A PC 1161 with a display is shown at hand for an agent using telephone 1162 and a PC 1171 is shown proximate telephone 1172 for use by an agent at telephone 1172.

In a very simple system there may be just one telephone and one PC proximate the telephone, therefore just a single equipped agent constituting the call-in center. In the system of FIG. 5 having two telephones, there are also two PCs. Each PC and associated telephone is considered here to constitute an agent station. Agent station 1160 comprises telephone 1162 and PC 1161, and agent-station 1170 comprises telephone 1172 and PC 1171.

In systems of the sort depicted by FIG. 5, having two or more agent stations, it is desirable that the PCs be connected in a Local Area Network (LAN), and this connectivity is shown in FIG. 5 with PCs 1161 and 1171 connected on a LAN 1152 wherein a data file server 1153 is also connected. Data file server 1153 in this system is the repository of customer data and the like accessible to agents manning the phones. Though not shown in FIG. 5 it will be apparent to those with skill in the art that there may be other servers on the LAN or elsewhere in the network as known in the art.

Telephone calls in the system of FIG. 5 are provided to telephone 1162 on line 1164 and to telephone 1172 on line 1174 from essentially anywhere represented by network cloud 1100. Cloud 1100 could represent a relatively small local calling area, a regional area, a single phone company or even the phone system of the entire planet. Calls are forwarded by telephony switches represented by telephony switch 1120.

Calls 1104 intended specifically for call-in center 1150 typically are received at Service Control Points (SCP) represented by SCP 1102, which are organized typically with one or more 800 numbers or the like. Calls received and processed at SCP 1102 are forwarded to switch 1120 which routes the calls to whatever area code and number is assigned to telephones 1162 and 1172. Other calls 1122 may also come into telephony switch 1120 and be routed to call-in center 1150. As is known in the art, SCP 1102 is also a telephony switch.

Also as is known in the art, there may be equipment associated with SCP 1102 to provide some additional functionality, such as an adjunct processor and an intelligent peripheral. For simplicity's sake these are not shown in FIG. 5, but FIG. 5 may be considered as typical of many prior art systems. In the rather simple system of the prior art represented by FIG. 5 some data (such as caller ID for example and Dialed Number Information Service {DNIS}), may be associated with calls forwarded to call-in center 1150. Such data to be useful in the system of FIG. 5 must be received by specialized equipment, such as familiar caller-ID boxes or telephone sets adapted to use the information being sold to people for home and business use.

Figure 6:
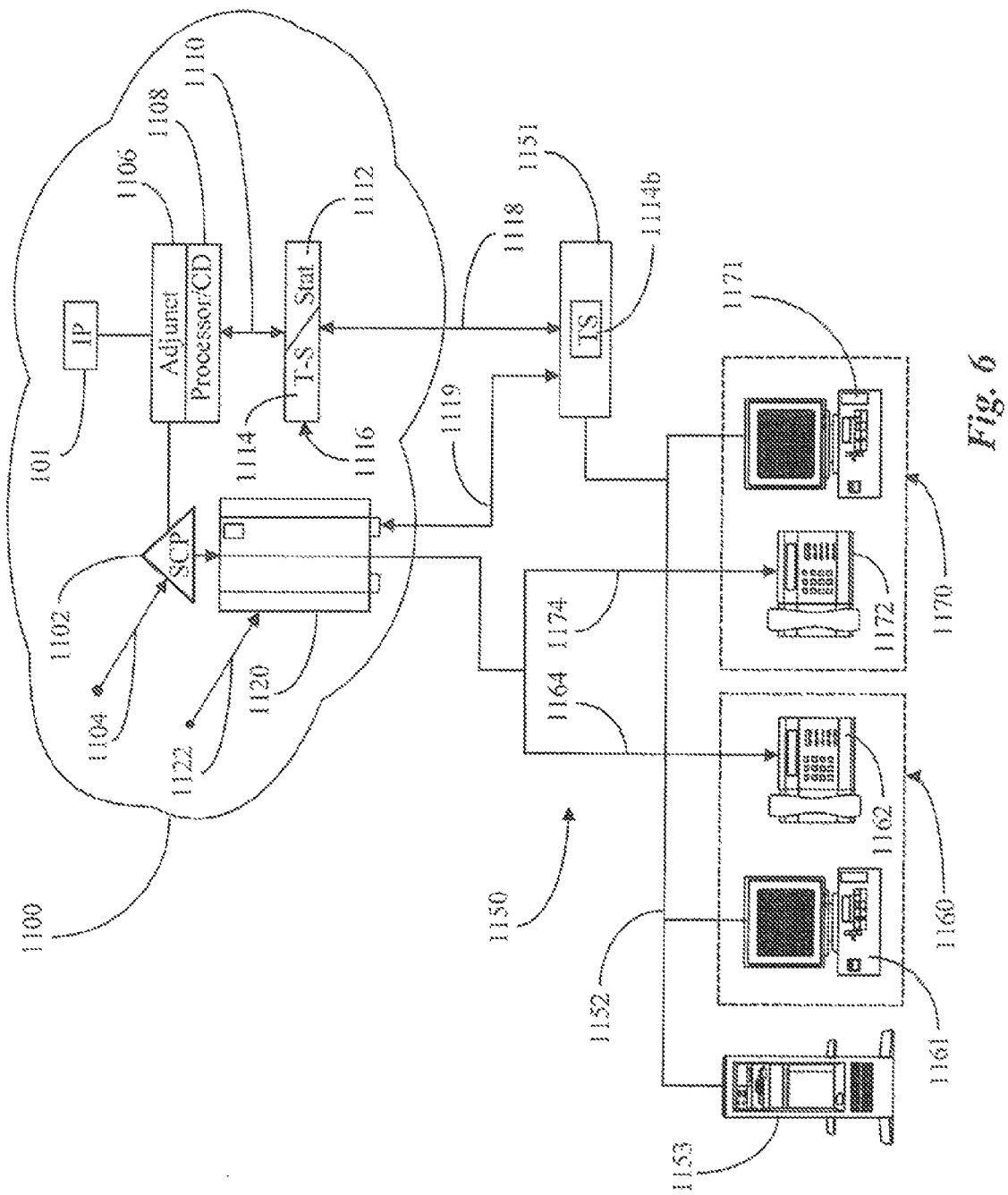
FIG. 6 is a block diagram of a call-routing and call-in system according to embodiments of inventions known to the present inventors.

Attention is now directed to FIG. 6, wherein a call-in system known to the present inventors is illustrated. In this system SCP 1102 receiving calls 1104 intended for call-in center 1150 has a connection to an adjunct processor 1106 in communication with both an intelligent peripheral 1101 and a call-distribution processor 1108. There is further a processor 1116 connected by a two-way communication link to call-distribution processor 1110. Processor 1116 comprises an instance of a unique application termed by the inventors a Telephony Server 1114, or T-Server, and a Statistical Server (Stat-Server) 1112. T-Server 1114 and functions provided by the T-Server are described in detail in the related patent applications listed above and incorporated herein by reference.

In the system of FIG. 6 a processor 1151 is provided at call-in center 1150, running a second instance of T-Server application 1114. Processor 1151 is coupled to processor 1116 in network cloud 1100 by a network link 1118, and to LAN 1152 by a network adapter. There is in addition a CTI connection 1119 between telephony switch 1120 in network cloud 1100 and processor 1151 at call-in center 1150. CTI connection 1119 may be an ISDN link or other data-type connection allowing transfer of CTI data and commands.

In the system of FIG. 6 information garnered in initial processing with use of IP 1101 may be provided by T-Server 1114 at processor 1116 to T-Server 1114 running on processor 1151 at the call-in center. This data can be used, then, ahead of a routed call, to, for example, to extract further data regarding a caller from a customer data base in file server 1153, and to provide the transferred and retrieved data at the PC display, such as PC 1161, proximate the telephone to which a call has been routed, for use by the agent manning that telephone.

Further, CTI transactional data retrieved from switch 1120 (line busy, line available, and the like), may be provided to T-Server 1114 at processor 1116, and in some cases in raw or processed form to Stat-Server 1112 to be used in routing by CD processor 1108. Many other functions described in the related applications listed above may now also be accomplished. Still further, Stat-Server 1114 running on processor 1151 can issue CTI commands to switch 1120 in the network cloud via CTI link 1119.

Although the system of FIG. 6 may be used to provide many CTI functions, there is a great dependence on telephony switch 1120. Some older switches are not capable of CTI functions and data sharing, and some others are very limited in their functions. Moreover, the organization that provides a call-in center under these circumstances has no control over the switches in the network cloud, and it may not be practical for such an organization to purchase and install an expensive CTI-capable switch on the premises of the call-in center. What is needed is an apparatus and methods that will provide CTI functionality in the absence of a workable CTI link, such as link 1119 in FIG. 2.

Virtual CTI Link

Figure 7:
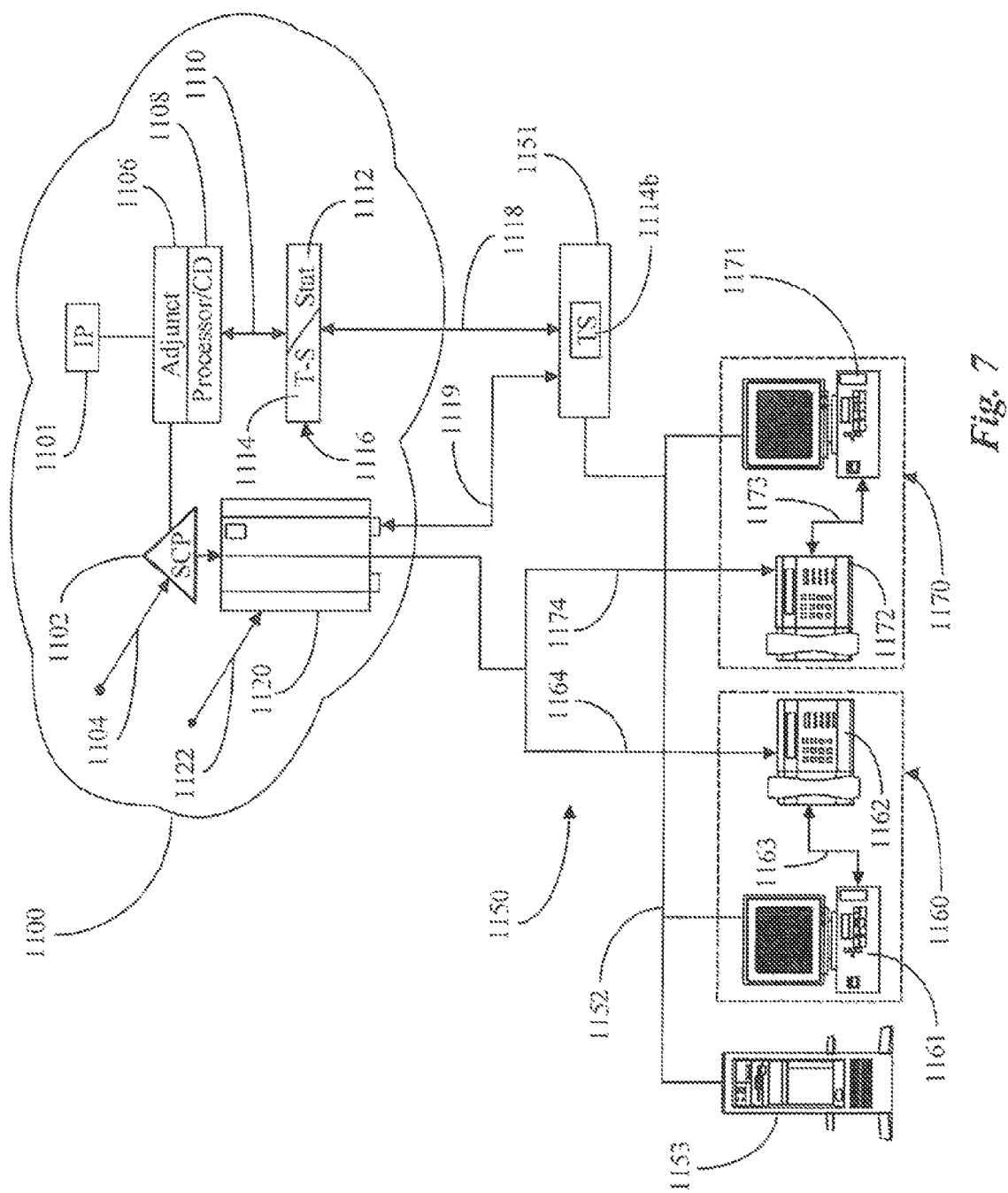
FIG. 7 is a block diagram of a call and information routing and call-center system according to an embodiment of the present invention.

FIG. 7 is a block diagram of a call and information routing and call-center system according to an embodiment of the present invention. The system of FIG. 7 has all of the connectivity and functionality of the system of FIG. 6, plus a data connection between each telephone in the call-in center and the associated PC. For example, in FIG. 7, PC 1161 is connected to telephone 1162 by link 1163, and PC 1171 is connected to telephone 1172 by data link 1173. Moreover, as previously described, each PC is connected on LAN 1152, which also connects to file server 1153 and to processor 1151 running an instance of T-Server 1114.

There are a number of different ways a telephone and PC may be connected, such as by a serial port and circuitry in the telephone and operating code in the PC such that the PC may monitor transactions of the telephone, including on-hook, off-hook, incoming caller-ID, ringing instance, and so forth. The PC via the data link may also exercise control over telephone functions. With this unique connectivity and adaptation, assuming is all of the telephones in a call-in center are thus connected and adapted, T-Server 1114 running on processor 1151 may acquire in aggregate all of the information otherwise available from switch 1120 via CTI connection 1119. T-Server 1114 on processor 1151 may then perform as though a fully workable CTI connection 1119 to switch 1120 is established.

Call and Data Correspondence

One of the important functions performed is identification of callers, retrieval of data relating to callers, and transmittal of such data to be displayed at the PC associated with each telephone at each agent station. The advantage to all is readily apparent. The agent fielding a call is thus more prepared to deal with the caller, and will have information readily at hand.

To provide the call and data display functionality desired it is, of course, necessary that a caller's identity be established and the caller's correct data be retrieved for display. There are some instances in the system depicted in FIG. 7 and described herein, wherein such correspondence may be a problem. Consider, for example, the circumstance wherein an original call has been routed to telephone 1162. The origination of the call and caller ID are not available in the system of FIG. 7 (with a non-functioning link 1119) until the call is connected to telephone 1162. At that point the necessary information is transferred to T-Server 1114 at processor 1151, and data specific to the caller may be retrieved and displayed at PC 1161.

Consider now the further circumstance that after the agent answers and the data retrieval begins, the original caller hangs up or is otherwise disconnected, and a second call 1122, a random call, entering the system not through SCP 1102 but directly into switch 1120, goes to telephone 1162. This circumstance could occur in a number of different ways, including a misdialed or misrouted call. There are also other sequences of events that could result in the same mismatch between call and data. Unless some action is taken, the data will be retrieved and displayed, although there will no correspondence between the data and the caller.

In this circumstance the origination information, which may be such as caller ID information or DNIS information, for the second (random) call will not indicate the call originates at SCP 1102. In an embodiment of the present invention, origination data transmitted to T-Server 1114 at processor 1151 indicating the call last received was not through a valid SCP will cause any data being prepared for display at the agent station to be halted. In some embodiments, depending on the capability of switch 1120, T-Server 1114 on processor 1151 may cause such non-SCP calls to be disconnected and/or rerouted, by command over link 1119.

Voice Extensions Through Integrated Agent Workstations

The direct connection of a telephone to a PC connected on a LAN to a processor with an operating T-Server provides a platform for a number of voice extensions useful in the overall process of customer service through call-in centers. Several such voice extensions in embodiments of the present invention are described herein below.

Call recording is a major need in customer service operations of the sort described herein, especially in operations dealing with financial markets and utilities. Such recording operations in current art are typically quite expensive to implement and difficult to manage. In an embodiment of the present invention an improved call recording facility is provided by virtue of the connection of the telephone to the PC by data link, and the functionality afforded through LAN 1152 and code as a part of T-Server 1114. In this embodiment a digital voice rendition of both parties to a call is transmitted on link 163 (for example) to PC 1161.

In one embodiment of the present invention all calls are recorded, subject of course to local laws governing such matters, and provision is made for selective archiving of recorded conversations. The recording is all digital, and may be accomplished in a number of ways, utilizing a number of commercially available hardware and software entities, such as those marketed under the name SoundBlaster™. The LAN connection and availability of data servers such as server 1153 provide for the rather large amount of digital data needed for such a recording operation. In this embodiment organization of the recorded database can be done in a variety of ways, categorized by agent, by subject, by product, and so on, and relational cross-referencing may be done as well, providing a well of information not before available in such call-in centers. In addition interactive search and retrieve functionality, and interactive report generation is provided. In another embodiment of the invention digital voice recording is provided on demand, under control of the resident agent and/or the agent's supervisor. It will be apparent to those with skill in the art that there are many different schemes that may be employed for digital voice recording, using the uniquely connected and managed apparatus of the present invention.

In other embodiments of the present invention voice playback is provided, with pre-recorded massages played to a caller under agent or Host control. Such pre-recorded messages may be recorded by an agent or other person, and stored either locally in the PC or more remotely, such as on a server connected to LAN 152. Such messages can include greetings, mandatory messages required under law in some cases, disclaimers, and all kinds of messages that may be very repetitive for an agent.

In other embodiments of the present invention voice recognition routines are used allowing an agent to invoke displays with spoken initiators on the telephone, recognized in the PC and acted upon either in the PC or through the PC by means of LAN 1152 by other servers on the LAN or by T-Server 1114. Voice recognition may also be used to detect upselling opportunities in the course of calls at PC connected telephones. Other voice recognition routines are used in embodiments of the invention to detect abusive or threatening speech, and to automatically save calls or portions of calls that match patterns for such speech.

Methods in Computer Simulation of Telephony Systems (3226)

The present invention in embodiments described below pertains to computer simulation of telephony call centers and activity and functionality of such centers and to computer telephony integration (CTI) as applied to such centers. It is well-known in the art that call center architecture and functionality is a rich and varied subject, and it is beyond the scope of the present specification to describe all of the rich variation in call center technology. There are, however, commonalties. Every call center, for example, is centered on a telephony switch, either at a customer's premises or provided by a telephone company. The telephony switch involved in a call center typically has one or more incoming trunks of telephone channels for receiving telephone calls, and typically one or more outgoing trunks as well, for placing calls back into the network.

Also common to call centers is the fact of connections to telephones at agent stations, which are typically assigned directory numbers. There may be just a few, dozens or even thousands of agent stations controlled by a single call center. In some call centers, only telephones are provided at agent stations. In others there may be computer terminals with display monitors, and the computer terminals may be interconnected on a local area network (LAN) along with network servers of various sorts. Call centers have recently been developed for providing video conferencing with agents. It may be seen that the architecture can be quite varied.

Telephone switches at call centers, depending on the model and manufacture, are capable of certain functions in switching, such as Automatic Call Distribution (ACD), queuing, playing recorded announcements to callers, and much more, and typically the functions available, and the manner in which the functions operate is specific to the make and model of the telephony switch.

In addition to all of the above, the systems of interest for the present invention are systems having a CTI link capability, enabling connection of a processor executing one or more usually customer-specific applications. According to the reference incorporated above, CTI involves three areas: (1) Call Control, which includes an ability to control and observe telephony calls, switching features and status, automatic call distribution (ACD) systems and ACD agents, and to use switching resources including tone generators and detectors; (2) Telephone Control, which is an ability to control and observe telephone devices; and (3) Media Access, which includes binding telephone calls to other media services.

In accomplishing the observation and control functions of CTI as listed above, applications executed on a CTI processor can be quite varied in function, really limited only to the imagination of application developers, and presently include such functions as agent-level routing, which will be familiar to those with skill in the art.

Figure 8:
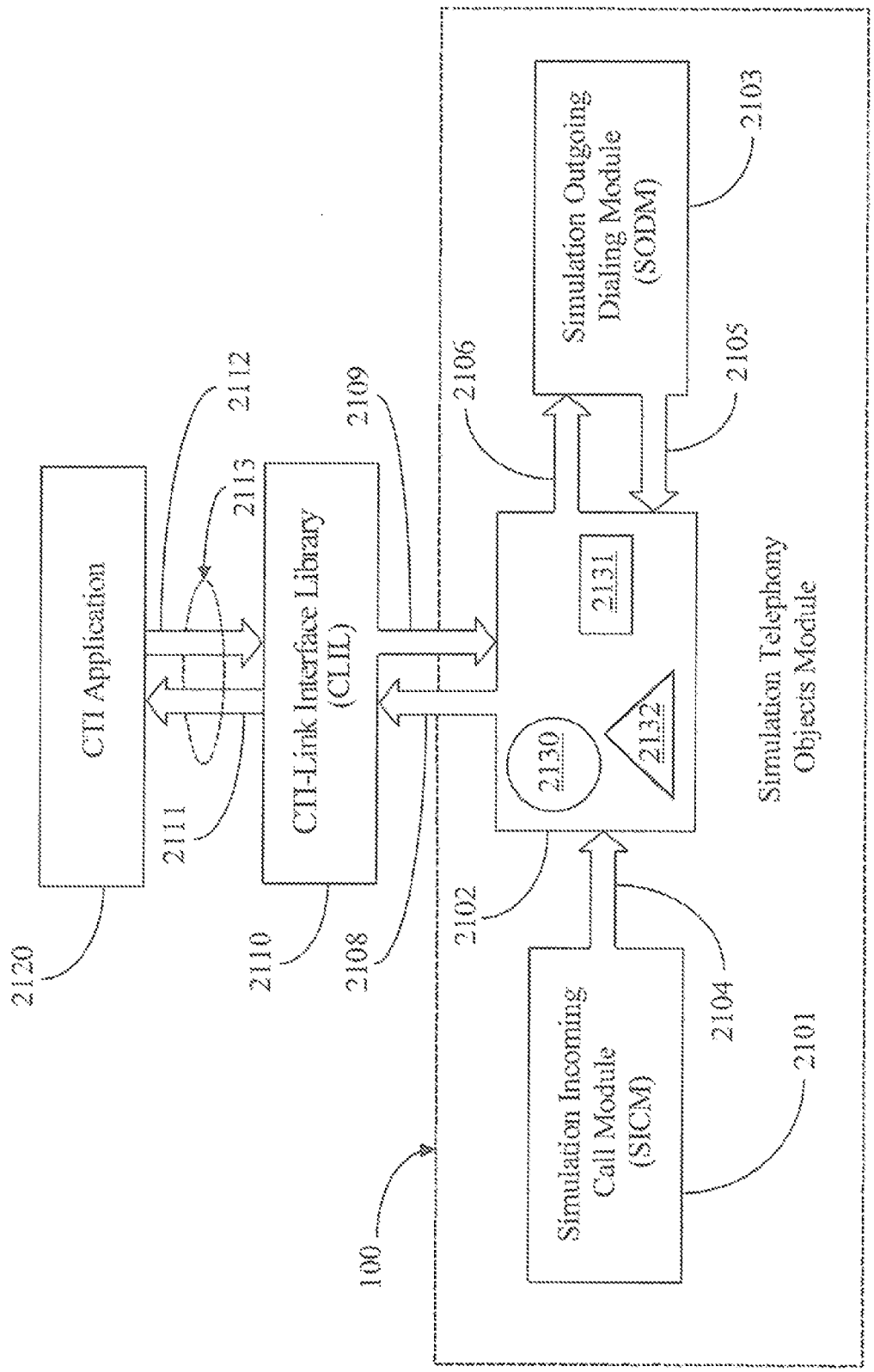
FIG. 8 is a block diagram depicting a simulated system according to a preferred embodiment of the present invention.

FIG. 8 is a block diagram depicting a simulated system according to a preferred embodiment of the present invention. In FIG. 8, boundary 2100 encloses software modules that emulate a call center and associated objects; boundary 2110 represents a unique CTI Link Interface Library (CLIL); and boundary 2120 represents a CTI application. Each of the three broad elements introduced here is described in further detail below.

In simulating a call center and associated elements as represented in FIG. 8 by group 2100, it is necessary to simulate both physical and logical elements. These include, but are not necessarily limited to (a) agents telephones and stations, (b) ACD, (c) ACD groups, (d) ACD queues, (e) incoming trunks, (f) outgoing trunks, (g) abstractions of communication relationship between one or more devices, and (h) communication with user applications.

In the example of FIG. 8, call center group 2100 comprises a software module 2101, termed a Simulated Incoming Call Module (SICM), which emulates incoming calls via one or more trunks 2104 to a switch 2102. The SICM operates with an ACD list, and simulates calls to ACD groups.

Switch 2102 is termed in embodiments of the invention a Simulated Telephony Objects Module (STOM), and comprises a variety of micro-emulated objects represented here by elements 2130-2132, which represent such as agents, ACD queues, and the like, as listed above.

Agent's telephones and agent stations as micro-emulated objects in a call center simulation will have attributes and statuses including, but not necessarily limited to two-line connections; perhaps a group relationship; and an equipment configuration mode (status when call offered, and status when call released).

Other entities that may become micro-emulated objects in a call center module, as represented by elements 2130-2132 include such as an Interactive Voice Response (IVR)system, remote access agents, media services that may appear in a call center switch, and generally, any feature that a call center switch can perform. Outgoing trunks have parameters including but not limited to a list of the outgoing trunks and a probability of answer result, such as answer, not answer, busy, answering machine, fax/modem, SIT tones, and so forth.

Calls in the simulation procedure have attributes and parameters including but not limited to origination party; destination party; PBX call identifier, DNIS number, ANI, and call status, such as connecting, waiting, alerting, or conferencing.

Elements 2130-2132, represented here as icons, may be, as indicated above, any function or behavior associated with STOM 2102, and it will be apparent to those with skill in the art that the three elements shown are not enough to depict all physical and logical elements that would have to be provided for STOM 2102 to make a realistic simulation. The elements shown, however, will be sufficient to teach to practice of the invention to those with skill in the art.

Software module 2103 represents an outgoing and return module, termed a Simulated Outgoing Dialing Module (SODM), wherein calls placed by STOM 2102 over path 2106 are modeled, and calls returned as a function of the outgoing calls over path 2105 are also modeled. STOM 2102 communicates with Interface Library 2110 via paths 2108 and 2109. Link 2113 represents a CTI link from application 2120 to switch 2102 via CLIL 2110.

The STOM notifies an application 2120 through CLIL 2110 of arriving calls, and data associated with arriving calls, as well changing status of telephony objects and statuses. STOM 2102 receives requests from application 2120 via CLIL 2110 to change status of agents phones and stations, such as login, logout, ready, not ready, or and busy. Requests are also received to change call status, such as answer, reconnect, disconnect, produce new call, transfer call, and include a call to a conference. If requested changes are available the STOM produces the changes and sends notification o the changes to application 2120 through CLIL 2110. If requested changes are not available, negative notification is sent.

In the embodiment of the invention illustrated by FIG. 8, although several computer functions are represented that may in a real system, rather than an emulated system, be executed on separate but connected and intercommunicating processors, all of the system represented by FIG. 8 will be typically executed on a single, relatively powerful computer. The various elements represented are software modules written to intercommunicate, and to simulate the behavior of real telephony systems.

FIG. 8 is more than a block diagram representing a system of the invention. FIG. 8 also represents a user interface wherein the elements are objects represented on a graphical user interface (GUI) as icons. The system of the invention is adapted such that object elements may be selected from a library and interchanged into an interconnected system.

As an example of the object-oriented nature of the GUI of FIG. 8, attention is directed to SICM 2101. This software module is a micro-application that, when initiated and operating may simulate calls to STOM 2102. A master SICM is developed that includes all of the characteristics of incoming calls. The master module has input parameters that allow a user to configure the module for certain behavior of interest. As an example, it may be of interest to test an application running as element 2120 against a rush of Christmas shoppers placing calls within a certain time frame at a certain rate, with the calls statistically distributed for a range of products for which agents at the emulated call center are adapted to enter orders and schedule deliveries.

The matter of importance in describing this invention is not the particular nature or statistical distribution of the calls, but the fact that the module has alterable parameters, also known as properties, which a user may manipulate to represent behavior of interest, and that the module is adapted to the system as an object, which may be removed and replaced by another object having a different parameter set. One may then quickly and conveniently alter the incoming conditions for a simulation, and new modules with different parameter sets may be developed off line and switched into the system.

Attention is now directed to STOM 2102. Iconic elements 2130-2132 are shown as three different shapes in FIG. 1. Each of these elements is a micro emulated object having alterable parameters. Description of an agent object should be adequate to illustrate the nature of the invention in this aspect.

Consider that element 2130 is a micro emulated agent module. This module may be selected from a library in the fashion described above for the SICM module, and dragged and dropped into switch 2132. Either before or after addition to the switch, parameters for the module may be accessed and set. It will be apparent to those with skill in the art that there may be a large number of agents assigned to a single call center, and that all of the agents may not have the same assignments or characteristics.

As an example of the versatility of the unique system, there may be, for example, agents for English speakers who call, and agents who speak Spanish for handling calls from Spanish-speaking customers. Certain agents may be trained for certain functions: to sell certain products, for example, or to provide technical assistance in certain situations. There may be, however, multiple instances of a micro-emulated agent. For example, of a Spanish-speaking agent assigned to first shift duty and trained to sell three specific related products. An icon represented agent, then, will have a multiplicity parameter. In setting up a simulation a user may select an agent, set certain parameters, then set the multiplicity parameter so that the call center will behave as though there were, say, twenty such agents.

It will be apparent to those with skill in the art that there are several ways parameters may be accessed and set for a micro-emulated object, such as element 2130, which may, for example, represent an agent having particular attributes. In one embodiment, for example, a selected icon representing a micro-emulated object may be caused to display an associated window in the GUI, and the window will have programming fields wherein a user may access and alter (edit) parameters. If the object is an agent, there may be, for example, a parameter field for language, for product knowledge, for shift assignment, and so forth; and, as indicated above, there may also be a parameter for multiplicity. If a simulated agent having a complete set of behavior parameters is to be represented multiple times in a call center simulation, the multiplicity parameter may be set for "n" instances, then the object will behave in operation of the simulation as "n" objects. The behavior of such objects can be in preferred embodiments, randomized, so the behavior, where there is a range, is not always the statistical average.

For example, even though there may be multiple instances of an agent with a certain characterization, it will never be true that every such agent will behave in exactly the same way. Some of the agents may habitually come late or leave early, and others may take longer than others for processing after calls are released. In an aspect of the invention such variations are accounted for by access to a statistical database and random generator. Typically the statistical average behavior of all such agents will be known, and may be stored in a manner to be accessible to the system. Multiple agents, otherwise identical in behavior, are caused to randomly alter their behavior in a way that the statistical average behavior is met.

It will be apparent to those with skill in the art that the above description of agent functionality and variation, and the method of applying parameters, multiplicity, and statistical behavior is not necessarily limiting in the invention. Many variations are possible, even including programming an individual module for each an every agent in a setup of interest.

Attention is now directed to CLIL 2110 and communication between STOM 2102 and CLIL 2110. CLIL is an interface library whose function it is to translate between STOM 2102 and application 2120 in a particular manner. STOM 2102 is configured in a manner that will be common to any of the several makes and models of available telephony switches currently available. Different makes and models of telephony switches communicate with CTI applications in different ways, however, and provide significantly different behavior specific to a particular make and model of switch. Communication may also be characterized by latency considerations. For example, in some real world situations one might wish to test, the telephony switch will be on the customer's premises, and in others, the telephony switch might be in the network, remote from the customer's premises. Latency issues in communication will differ by the different switch location, even with the same physical switch.

CLIL is a switch-dependent layer that controls communication of commands and status over data paths 2108/2109 and CTI link 2113. The function of CLIL 2110 is to add switch dependent characteristics to the communication, so one simulated generic call center can be made to appear to a CTI application as a particular make and model of a switch connected in a specific manner. The particular value of CLIL 2110 is that an application may be tested against one make and model of a switch, and, by selecting a different layer of software from CLIL 2110, one may then test the same CTI application against a different make and model of switch and/or location and connectivity of a switch. user may quickly and conveniently substitute one CLIL setup for another for communication with a switch of interest.

Internet Protocol Network Telephony (IPNT)

In all of the embodiments and aspects of the invention described above specific example have been drawn from the technological area of conventional intelligent telephony networks, other than what is now known as Internet protocol network telephony, wherein computers simulate telephones through software, microphones, and speakers, and telephony data between such equipped computers is transmitted over Internet connections and directed by servers, such as destination number servers (DNS) in the Internet. In the IPNT world IP addresses are used instead of telephone numbers, and there are differences in the way data packets are formulated and transmitted. Moreover, what may be termed routing is done by such as IP switches and hubs, wherein destination addresses may be changed. These differences, however, are not limiting in embodiments of the present invention.

In many embodiments of the invention described, the inventions are involved with new and unique ways to use machine intelligence for telephony functions, particularly, but not exclusively, as these functions relate to call centers and intelligent routing of calls. In instances of the invention described, the principles of the invention may also be applied to IPNT without undue experimentation.

As examples of IPNT application, in those embodiments dealing with personal routing and personal routers, the methods and apparatus described may also be adapted to IPNT so personal routing rules, negotiation, and the like may be provided for IPNT calls as well. In the aspects of the invention dealing with simulation of CTI applications and testing, the applications may apply to IPNT telephony as well as to more conventional telephony systems. Other examples will be apparent to those with skill in the telephony arts.

It will be apparent to those with skill in the art that there are many alterations that may be made in the embodiments of the invention herein described without departing from the spirit and scope of the invention. Some of these have been described above, such as the use of a telephony server like T-Server 1207 running on processor 1223. In some cases such a server is not needed to practice the invention, as was described above.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A method for routing telephone calls at customer premises having a telephony switch, individual telephones connected to the telephony switch, and computer workstations including video display units (VDUs) connected on a local area network (LAN) also coupled to the telephony switch, wherein individual ones of the computer workstations are located proximate individual ones of the telephones, the method comprising:

receiving a telephone call at a telephony switch connected to individual telephones at the customer premises;

broadcasting identifying data for the telephone call to first and second computer workstations of the computer workstations, via the LAN;

determining a routing for the call at one of the first and second computer workstations by use of a client interface, and transmitting the routing determination to a client-server router via the LAN connection, wherein the determining the routing for the call is based on the broadcast identifying data and a routing rule associated with a user of the one of the first and second computer workstations; and routing the telephone call to the one of the first and second computer workstations but not a second one of the first and second computer workstations by the client-server router according to the routing determination transmitted to the client-server router via the LAN connection.

2. The method of claim 1 wherein the client-server router executes on a processor coupled to the telephony switch.

3. The method of claim 1 further comprising:

accessing and editing the routing rule by the user.

4. The method of claim 1, wherein the client interface comprises a graphical user interface having icons indicating telephone calls received and choices of disposition of the telephone calls received.

5. The method of claim 1, wherein the routing rule is editable by the user.

6. The method of claim 1, wherein the broadcast identifying data comprises at least one of a caller identification associated with the telephone call, call data transmitted with the telephone call or retrieved from a server, a direct inward dialing number, or a number of rings.

* * * * *